(12) United States Patent
Rey

(10) Patent No.: US 7,841,606 B2
(45) Date of Patent: Nov. 30, 2010

(54) RACK STEERING MOTOR VEHICLE

(76) Inventor: André Rey, 10 rue Jean-Philippe Rameau, Castres (FR) 81100

( * ) Notice: Subject to any disclaimer, the term of this patent is extended or adjusted under 35 U.S.C. 154(b) by 242 days.

(21) Appl. No.: 12/294,618

(22) PCT Filed: Apr. 23, 2007

(86) PCT No.: PCT/FR2007/000680

§ 371 (c)(1),
(2), (4) Date: Sep. 26, 2008

(87) PCT Pub. No.: WO2007/128898

PCT Pub. Date: Nov. 15, 2007

(65) Prior Publication Data

US 2010/0171281 A1 Jul. 8, 2010

(30) Foreign Application Priority Data

May 5, 2006 (FR) .................................. 06 04053

(51) Int. Cl.
*B62D 3/12* (2006.01)

(52) U.S. Cl. ...................... 280/93.514; 74/422; 74/498; 180/427; 280/124.125

(58) Field of Classification Search ................... 74/422, 74/492, 496–500; 180/427, 428; 280/93.514, 280/93.515, 124.125–124.127, 124.134, 280/124.145, 124.152, 124.154; *B62D 3/12*
See application file for complete search history.

(56) References Cited

U.S. PATENT DOCUMENTS

| 3,495,847 | A | | 2/1970 | Rey | |
|---|---|---|---|---|---|
| 3,617,071 | A | * | 11/1971 | Ivancic | .................... 280/93.51 |
| 4,440,254 | A | * | 4/1984 | Shibahata et al. | ........... 180/414 |
| 4,880,074 | A | * | 11/1989 | Matsumoto | ................. 180/444 |
| 5,002,142 | A | * | 3/1991 | Klosterhaus | ................. 180/444 |
| 5,143,400 | A | | 9/1992 | Miller et al. | |
| 5,613,572 | A | * | 3/1997 | Moedinger | ................. 180/400 |
| 6,272,409 | B1 | | 8/2001 | Elwood | |

FOREIGN PATENT DOCUMENTS

FR 1 405 629 A 7/1965

* cited by examiner

*Primary Examiner*—Paul N Dickson
*Assistant Examiner*—Laura Freedman
(74) *Attorney, Agent, or Firm*—Young & Thompson

(57) ABSTRACT

A motor vehicle wherein the steering includes: a steering bar including a rack steering component and a steered component fitted in a sliding manner; a rack housing passed through by the steering component and including a plate displaying a correction sliding rail receiving a roller; two correction arms; assembly elements of the rack housing suitable for allowing pivoting of the rack housing in a steering plane, around an attachment axis obliged to move in a direction contained in the steering plane and in a longitudinal plane of the chassis; a telescopic steering column; two steering gears connecting the steering component and the steered component to the stub pivot arms of the front guiding wheels. The correction slide rail follows a suitable curve such that the vehicle wheel stubs extend along directions that intersect, at each time, at the same point.

20 Claims, 14 Drawing Sheets

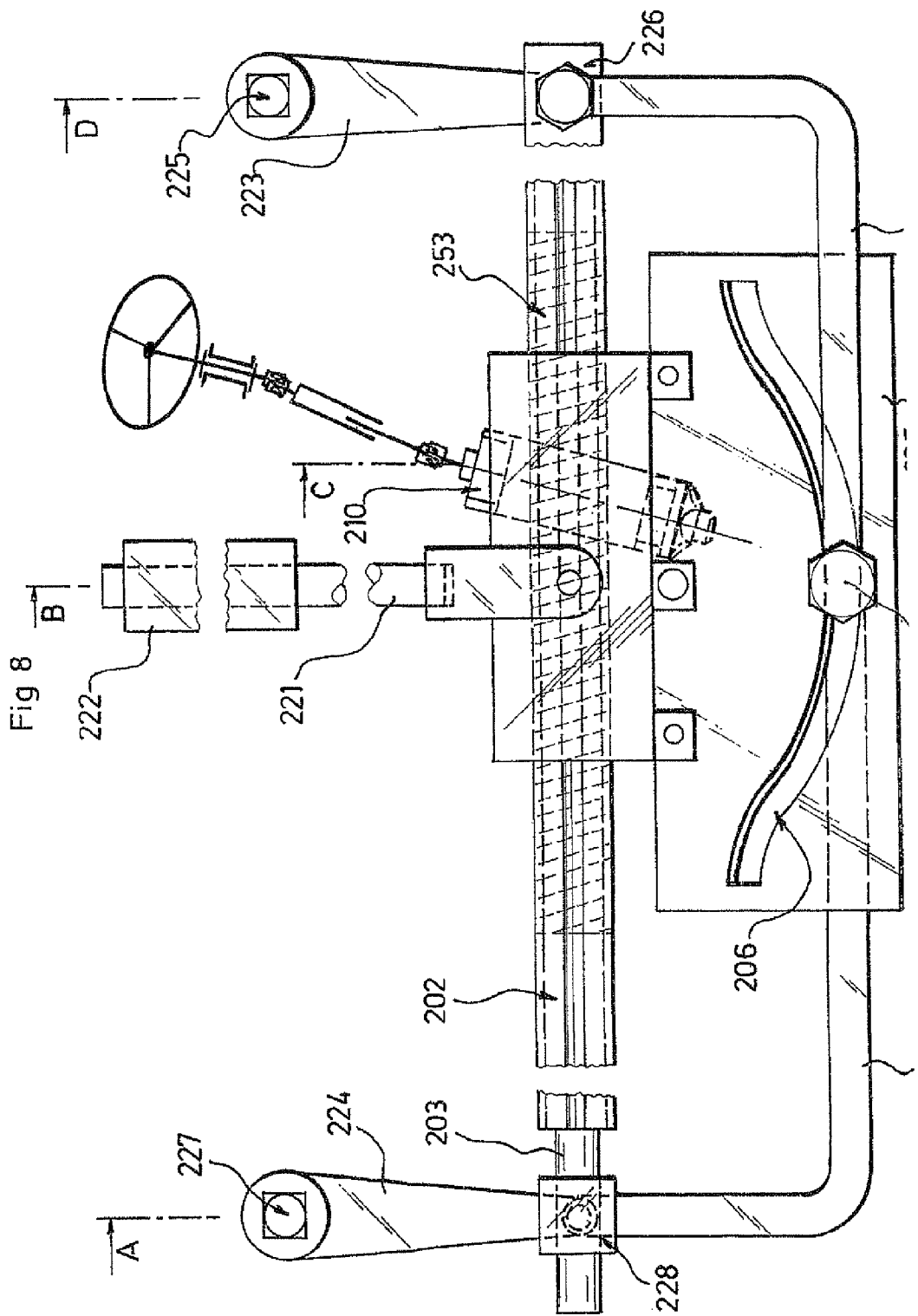

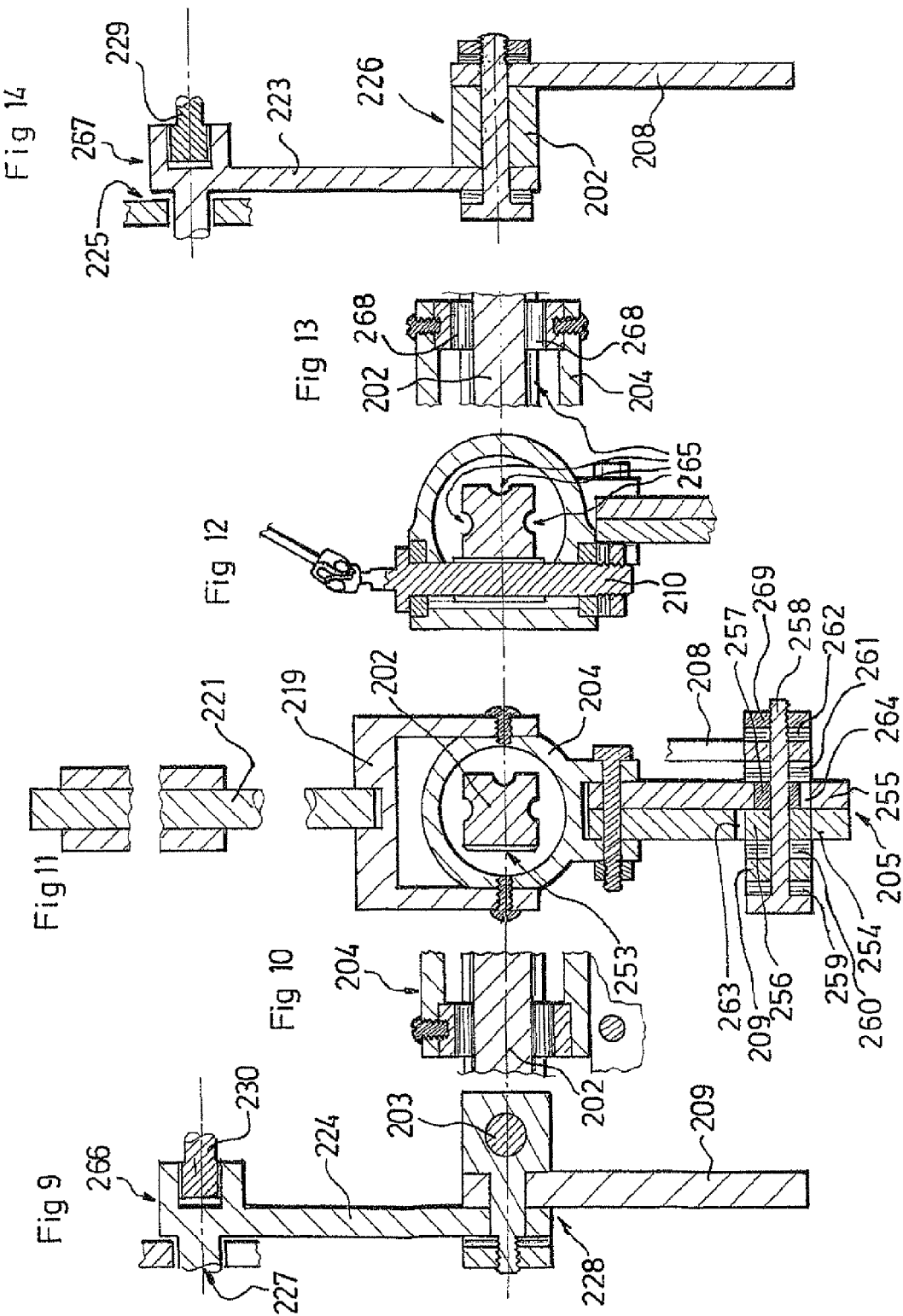

RACK STEERING MOTOR VEHICLE

The invention relates to a motor vehicle steering system and to a vehicle fitted with said steering system.

A vehicle usually comprises at least four wheels including at least two guide wheels at the front of the vehicle. Each guide wheel is borne by a stub, to which an arm known as a stub pivot arm is rigidly secured. Each stub pivot arm has an end secured to the stub with which it is associated, and an opposite end known as the actuation end. Said stub and said stub pivot arm are mounted for rotating around an axis known as the stub pivot axis. The vehicle further comprises a steering system for bringing about and controlling the deflection of the front guide wheels around the stub pivot axes. The steering system particularly comprises a steering column generally controlled by a steering wheel that can be activated by a driver, and a tie bar for connecting the actuation ends of the stub pivot arms of the two front guide wheels, with a view to a combined deflection of said wheels. The tie bar is generally attached to the two stub pivot arms by means of two coupling lever arms, which, inter alia, ensure that the steering is compatible with the vehicle suspension (it should be remembered that the steering and suspension fittings are connected on the one hand to the axle and on the other hand to the vehicle chassis. Compatibility is obtained when the suspension movements do not cause the wheels to deflect or when the influence of the suspension on wheel deflection is negligible).

It should be noted that the front guide wheels of light vehicles are generally independent. Conversely, heavy vehicles generally comprise a rigid axle that rigidly connects the stubs of the front guide wheels. Throughout the following text, the term "axle" will denote a dummy axle (straight connecting the two stubs and cutting the two stub pivot axes) if the wheels are independent or a real axle if the contrary holds true.

There are mainly two types of steering:
drop arm steering systems, comprising a steering gear box with a screw mechanism that allows an axial rotation of the steering column to be converted into a pivoting of a drop arm, said drop arm driving in axial translation a steering arm fitted longitudinally in the vehicle. The steering arm is articulated on an actuation lever secured to the stub of one of the two guide wheels, such that an axial translation of the steering arm causes the actuation lever (and therefore the wheel) to rotate around the stub pivot axis (the other wheel also being deflected due to the tie bar);
rack steering systems, which comprise a pinion driven by the steering column, said pinion engaging with a rack formed on the tie bar; an axial rotation of the steering column is thus directly converted into an axial translation of the tie bar (translation in a transverse direction of the vehicle), said translation causing the wheels to deflect. The pinion and the rack are accommodated in a rack housing mounted fixed relative to the chassis. The rotation axis and the position of the pinion are therefore fixed relative to the chassis; the tie bar extends and is guided in axial translation in a transverse direction that is fixed relative to the chassis. The presence of coupling lever arms (between said bar and each stub pivot arm) is consequently indispensable in order to allow a translation of the tie bar.

It should be noted that, the larger the dimension of the stub pivot arms in the longitudinal direction of the vehicle (in other words the further the tie bar is away from the vertical plane containing the front axle), the greater the translation of the tie bar must be for a given steering angle (of one of the wheels).

In other words, the steering angles of the wheels corresponding to a given translation of the tie bar get bigger as the dimension of the stub pivot arms in the longitudinal direction of the vehicle gets smaller. In fact, in the case of a rack steering system, the translation of the tie bar is, by construction, limited, given its layout in the vehicle (guiding in translation and connection to the stub pivot arms). In the case of a drop arm steering system, this limitation is desirable in order to prevent the tie bar from extending laterally beyond the vehicle body. This is why, in order not to unduly restrict the maximum turning angles of the wheels, the tie bar is always fitted a small distance away from the vertical plane containing the front axle.

Hitherto, heavy vehicles have almost all been fitted with drop arm steering systems. Conversely, light vehicles are to a very large extent fitted with rack steering systems, which, compared with drop arm steering systems, have the advantage of being more straightforward in design, costing less and giving greater driving comfort. In fact, by their design, the screw housings (of drop arm steering systems) are particularly expensive and do not fully absorb all the shocks sustained by the wheels (shocks which as a result are partly transmitted to the steering column and which can be felt by the driver in the steering wheel).

To allow a turn to be made without the vehicle wheels skidding on the ground, the wheels are required to describe curves that have one and the same pitch centre. In other words, the axes of all the vehicle wheels must constantly meet at one and the same point. In the case of a four-wheel vehicle whereof only the front wheels are guide wheels, the axes of the front wheels must therefore intersect at each time at one and the same point located in the extension of the rear axle. To perform a skid-free turn, with each value of the steer angle β of the front wheel nearside to the turn therefore corresponds a unique value of the steering angle a of the front wheel offside to the turn, which differs from that of the angle β.

Furthermore, national and international rules and safety standards all lay down that a vehicle steering system must be fully mechanical. It is of course permissible for the steering system to be equipped with hydraulic or pneumatic support means, possibly involving electronic control means, provided the control of the steering angle of each guide wheel remains purely mechanical from start to finish.

Jeantaud initially proposed, in the particular case of a vehicle fitted with a rigid axle and a drop arm steering system, a simple reduced-scale drawing offering an approximate solution to the problem of the skid-free turn. In this drawing, the tie bar is of fixed length. Furthermore, the tie bar, the front axle and the stub pivot arms form a deformable trapezium, with the stub pivot arms extending in directions which meet each other slightly before the middle of the rear axle when the wheels are straight (in other words when they both have a zero steering angle). Put another way, each stub pivot arm forms a non zero angle with the plane of the wheel to which it is secured, an angle whereof the tangent is close to v/2e, where "v" denotes the vehicle gage (the length of the axle) and "e" denotes the vehicle wheelbase (the distance separating the front and rear axles).

This solution is only strictly correct for a unique turning angle of the vehicle (in other words for a unique pair of wheel steering angles (a, β). It remains acceptable for small turning angles, the distortions of the tires compensating for the error between the steering angles of the two wheels. On the other hand, for angles above 40°, this solution is totally unacceptable, so that any turn with an angle above 40° needs to be prohibited mechanically. Whatever the circumstances, the fact that this is only an approximate solution to the problem of the skid-free turn is conveyed by the premature wear on the tires.

Furthermore, this solution only applies to drop arm steering systems, which have now been abandoned (because they are too costly and less comfortable) as far as light vehicles are concerned.

For a strict fulfillment of the conditions for a skid-free turn, consideration has been given to activating each guide wheel separately. But none of the mechanical solutions proposed hitherto has been applied on account of their extreme complexity, their space requirement, and their manufacturing cost.

In the interests of finding a solution to the problem of the skid-free turn which, on the one hand is compatible with a rack steering system, and on the other hand allows steering angles above 40°, the inventor has previously proposed, in his patent FR 1 405 629, that the rigid tie bar of the vehicle should be replaced by two articulated half-bars, to give a "dummy tie bar" of variable length. He had in fact observed that the conditions for a skid-free turn also imply that the distance L separating the actuation ends of the two stub pivot arms varies as a function of the steering angle of the wheels. The inventor has shown in particular that, to each value of the steering angle β of the wheel nearside to the curve, there corresponds a unique value of the distance L, as defined by the following equations:

$$L = \frac{v + l(\sin\beta - \sin\alpha)}{\cos\theta}$$

$$tg\alpha = \frac{e}{v + \frac{e}{tg\beta}}$$

$$tg\theta = \frac{l(\cos\alpha - \cos\beta)}{v + l(\sin\beta - \sin\alpha)}$$

where "v" denotes the vehicle gage,

"l" denotes the length of the stub pivot arms,

"e" denotes the vehicle wheelbase,

"θ" denotes the angle formed by the tie bar relative to the front axle, and in the particular case of a vehicle whereof each front wheel stub is horizontal (zero camber angle), each stub pivot axis is vertical (zero tilt angle) and extends in the plane of the front axle (zero caster angle), each stub pivot arm extends to the front of the front axle and orthogonally to the stub to which it is secured (in other words parallel to the wheel plane).

It should be noted that different equations can be obtained if, as a hypothesis, one or more of the camber, tilt and caster angles is/are non zero and/or if the stub pivot arms extend to the rear of the front axle and/or if each stub pivot arm forms a non zero angle with the plane of the wheel to which it is secured. The inventor has shown however that, in all cases, the distance L finally depends only on β and on fixed vehicle parameters.

The steering system proposed by the inventor in FR 1 405 629 includes two tie half-bars extending in parallel planes, each half-bar being articulated, at one end, on the other half-bar and being connected, at the other end, to a stub pivot arm. The half-bars are articulated one on the other by means of a shaft whereof the axial rotation is controlled by the steering column. Said shaft carries, on each side of the half-bars, a bearing which slides in a slot in the rack housing defining a broken line raceway, and a pinion which engages with a broken line rack.

This steering system has the advantage of allowing steering angles above 40°, (and possibly up to 90°) thereby improving the maneuverability of the vehicle (which can now be made to turn upon itself). This steering system offers only an approximate solution to the problem of the skid-free turn. Moreover, it is tricky to implement and there is no guarantee as to its durability: the teeth of the racks must be machined with great precision particularly at the inflection points of the broken line, to allow the pinions to move from one segment of said broken line to the other without jarring; these inflection points remain points of weakness and wear on the racks.

Subsequent to this proposal, automobile manufacturers have striven to develop solutions that integrate a (rack) tie bar of variable length. U.S. Pat. No. 6,272,409 and U.S. Pat. No. 5,143,400 thereby recommend that the vehicle is fitted with a telescopic tie bar equipped with pneumatic, hydraulic or mechanical means for varying its length, and that said means are controlled by an electronic circuit, suitable for calculating in real-time the length that said tie bar should be in order to fulfill the conditions for a skid-free turn as a function of the steering angle of one of the two wheels. As previously explained, these electronic solutions, which clash with safety regulations and standards, can find no practical application.

The invention sets out to overcome these drawbacks by offering for the first time a rack steering system that provides a purely mechanical and theoretically accurate solution—in the absence of vehicle suspension—to the problem of the skid-free turn, in particular for turning angles of between 0 and 40°. The invention also sets out to provide a vehicle steering system which allows a skid-free turn for angles above 40°.

One purpose of the invention is to provide a vehicle steering system which allows turning angles of up to 90°. A particular aim of the invention is to resolve, for angles above 40°, not only the problem of the skid-free turn but also that of buttressing (explained below).

Another purpose of the invention is to offer a vehicle steering system that is of straightforward design, robust and inexpensive.

Not all vehicle models have the same space at their disposal to accommodate the steering system. Moreover, the dimensions of the vehicle's front power module—and consequently of the space available to accommodate the steering system—tend today to be cut down in favor of the passenger compartment and of greater vehicle compactness. Another purpose of the invention is to offer a range of vehicle steering systems compatible with most known recent vehicle models, said range comprising steering systems that are similar in design but have different geometries and space requirements.

Another purpose of the invention is to provide a rack steering system which satisfies new impact standards.

Another purpose of the invention is to provide a steering system which is compatible with different suspension types.

The invention relates to a motor vehicle that includes:

a chassis, wheels including at least two guide wheels at the front of the vehicle, each guide wheel being borne by a stub to which an arm known as a stub pivot arm is rigidly secured, said stub and said stub pivot arm being mounted for rotating around an axis known as the stub pivot axis, the stub pivot arm having one end secured to the stub and an opposite end known as the actuation end;

a steering system comprising:
- a steering column controlled, in axial rotation, by a steering wheel that can be activated by a vehicle driver,
- a pinion driven in rotation by the steering column,
- a rack with which the pinion engages,
- a rack housing receiving said pinion and said rack.

The vehicle as claimed in the invention is characterized in that:
- the steering system comprises a unit forming a bar, known as the steering bar, said steering bar comprising at least two coaxial components mounted for sliding one relative to the other in an axial direction of said steering bar, one of the components being known as the steering component, the other component being known as the steered component; preferably, the steering bar extends in a substantially transverse direction of the chassis when the wheels are straight,
- the steering component passes through the rack housing and bears the rack, such that rotating the pinion causes a translation of the steering component in the axial direction of the steering bar,
- the rack housing comprises a plate, known as the correction plate, comprising a slot forming a slide rail, known as the correction slide rail, receiving a roller suitable for moving along said correction slide rail,
- the steering system comprises two arms, known as correction arms, one of said correction arms being mounted articulated, at one end, on the roller and, at the other end, on the steering component, the other correction arm being mounted articulated, at one end, on the roller, and, at the other end, on the steered component, such that the steering bar and the two correction arms form a triangle that is deformable according to the position of the roller in the correction slide rail,
- the steering system comprises means for assembling the rack housing in the vehicle, suitable for allowing the rack housing to pivot in a plane known as the steering plane, around an axis of said housing known as the attachment axis, the assembly means being moreover suitable for preventing any movement of the attachment axis in a transverse direction of the chassis and for allowing said attachment axis to move in a direction contained in the steering plane and in a longitudinal plane of the chassis,
- the steering column is suitable for absorbing any movement of the rack housing; for example, the steering column comprises at least two coaxial parts mounted for sliding one relative to the other in an axial direction of the steering column, including one part coupled to the axis of the steering wheel and one part coupled to the pinion, so that the distance between the pinion and the steering wheel is able to vary; furthermore, at least one of the couplings connecting the steering column to the pinion and to the steering wheel axis comprises a cardan joint (or equivalent) so as to be able to absorb a variation in the angle formed by said steering column and said axis of the steering wheel or pinion;
- the steering system comprises a first steering gear connecting the steering component to the actuation end of one, the first one, of the stub pivot arms, and a second steering gear connecting the steered component to the actuation end of the second stub pivot arm,
- the correction slide rail follows a suitable curve, according to the first and second steering gears, such that the vehicle wheel stubs extend in directions which intersect, at each time, at one and the same point. In particular, in the most frequent case of a vehicle on which only the front wheels are guide wheels, the correction slide rail follows a suitable curve such that the front wheel stubs of the vehicle extend in directions which intersect, at each time, at one and the same point located on the axis of the rear axle.

The steering bar as claimed in the invention has one dimension, known as the steering length, which is variable and defined as being the distance separating a reference point of the steered component from a reference point of the steering component. The examples expanded upon below will make it possible to understand that, in order for the conditions for a skid-free turn to be met, to each steering angle $\beta$ of one of the wheels there corresponds a unique value of this steering length (as has previously been shown by the inventor in respect of length of a common tie bar) and therefore a unique position of the roller on the correction plate. It is thus possible to specify point by point, or possibly by positing simple equations of trigonometry and geometry, the curve that must be described by the roller and consequently the correction slide rail so that the conditions for a skid-free turn are met. This curve depends on a unique variable: $\beta$. It depends conversely on many fixed geometrical parameters: apart from the vehicle construction parameters previously mentioned (gage, wheelbase, caster angle, camber angle, tilt angle), it also depends, on the one hand, on the geometry chosen for the steering bar, the rack housing and the correction aims—and particularly on the dimensions of the steering and steered components, on the length of each correction arm and on the location of the articulation of said arm on the corresponding steering bar component, on the position of the rack housing relative to the steering bar in the transverse direction of the chassis, etc. The curve depends on the other hand on the steering gears selected. It is therefore possible to specify a general equation for this curve which covers all scenarios. The following description will provide a few examples. And the man skilled in the art will be able to specify (points by points), without having to develop an inventive step, the curve that must be followed by the correction slide rail in each particular case, depending on the vehicle and on the construction choices he will have made.

As can be seen, the steering plane can be positioned at any distance from the front guide wheels and in such a way as to specify any angle with a horizontal plane, as long as the steering gears are adapted as a function of the position selected. From one vehicle to another, the location of the rack housing and correction plate thereof may vary, as a function of the space available within the vehicle. It is therefore possible to offer an entire range of steering systems (each comprising housing and steering gear) compatible with many vehicle models.

In a first version of the invention:
- the steering bar extends in proximity to the front axle, for example between the front guide wheels,
- the first steering gear comprises a first coupling lever arm, articulated on one end of the steering component and on the actuation end of the first stub pivot arm respectively; preferably, said first lever is articulated on the stub pivot arm by a ball joint connection and it is articulated on the steering component by a pivot connection,
- the second steering gear comprises a second coupling lever arm, articulated on one end of the steered component and on the actuation end of the second stub pivot arm respectively; preferably said second lever is articulated on the stub pivot arm by a ball joint connection and it is articulated on the steered component by a pivot connection.

In other words, in this first version, the steering bar as claimed in the invention acts as a tie bar in the usual sense of the term: it extends substantially between the two front guide wheels and is connected to the stub pivot arms by means of two coupling lever arms. However, unlike with common tie bars, given the assembly means as claimed in the invention, the steering bar is not guided in translation in a transverse direction fixed relative to the chassis. It is, on the contrary, caused to move in the steering plane. Subsequent movements of the pinion are absorbed by the steering column and are not therefore transmitted to the steering wheel.

In this first version of the invention, the steering plane is preferably substantially horizontal, and the rack housing and steering bar are for example fitted under the vehicle gearbox.

To advantage and as claimed in the invention, in this first version, the steering system comprises at least one level compass connecting one of the components of the steering bar to the chassis. Preferably, the steering system comprises two level compasses, one connecting the steering component to the chassis, the other connecting the steered component to the chassis.

In a second and third version of the invention:
the vehicle has no tie bar,
the first steering gear comprises a link, known as a support link, which extends in a plane parallel to (and particularly merged with) the steering plane and which carries the steering component of the steering bar, said support link being mounted for pivoting, at one end known as the rotation end, around the axis fixed relative to the chassis and being articulated, at the other end, on the steering component; it should be noted that the steering component may be suspended from the support link or supported (from underneath) by it.
the second steering gear comprises a link, known as a support link, which extends in a plane parallel to (and particularly merged with) the steering plane and which carries the steered component of the steering bar, said support link being mounted for pivoting, at one end known as the rotation end, around an axis fixed relative to the chassis and being articulated, at the other end, on the steered component; it should be noted that the steered component may be suspended from its support link or supported by it.

In the second version, the first and second steering gears also each comprise at least:
a rod, known as the driving rod, which extends orthogonally to the support link, said rod having an end, known as the upstream end, coupled to the rotation end of the support link by means of a coupling suitable for converting a pivoting of the support link into an axial rotation of the driving rod, said driving rod preferably being guided in axial rotation in the vehicle by means of at least one bearing fixed relative to the chassis, the opposite end of the driving rod being known as the downstream end,
a rod, known as the driven rod, which has an end, known as the upstream end, connected to the driving rod by means of fittings, known as intermediate fittings, suitable for converting an axial rotation of the driving rod into an axial rotation of the driven rod, said driven rod preferably being guided in axial rotation in the vehicle by means of at least one bearing fixed relative to the chassis, said driven rod having an opposite end known as the downstream end,
a lever not parallel to the driven rod, said lever having an end, known as the upstream end of the lever, coupled to the downstream end of the driven rod by means of a coupling suitable for converting an axial rotation of the driven rod into a rotation of the lever around the axis of said driven rod, the opposite end of the lever being known as the downstream end of the lever,
a link known as a connection link, freely articulated, at one end, on the downstream end of the lever and, at the other end, on the actuation end of the stub pivot arm (the terms "freely articulated" signifying, throughout the description, that a ball joint connection is involved). It should be noted that the two connection links ensure compatibility between steering and suspension.

The above-mentioned couplings are preferably constant velocity couplings such as rigid couplings.

The intermediate fittings, inserted between the driving rod and the driven rod, comprise for example an angle transmission directly coupling the downstream end of the driving rod and the upstream end of the driven rod. Alternatively, to advantage and as claimed in the invention, these intermediate fittings comprise a rod, known as an intermediate rod, not parallel to the driving and driven rods, said intermediate rod being coupled, at one end, to the downstream end of the driving rod by means of an angle transmission suitable for converting an axial rotation of the driving rod into an axial rotation of the intermediate rod, said intermediate rod being coupled, at the other end, to the upstream end of the driven rod by means of an angle transmission suitable for converting an axial rotation of the intermediate rod into an axial rotation of the driven rod. Alternatively, the intermediate fittings comprise a succession of several intermediate rods connected to each other and to the driving and driven rods by angle transmissions, said intermediate rods being, as required, guided in axial rotation by means of bearings fixed relative to the chassis.

The above-mentioned angle transmissions are preferably constant velocity angle transmissions: angle transmissions via bevel gears, cardan joints etc.

In the third version, the first and second steering gears also each comprise at least:
a first rod which extends in a substantially transverse direction fixed relative to the chassis, and which has one end, known as the upstream end, coupled to the rotation end of the support link by means of a coupling suitable for converting a pivoting of the support link into an axial rotation of the first rod, said first rod preferably being guided in axial rotation by means of at least one bearing fixed relative to the chassis, the opposite end of the first rod being known as the downstream end,
a drop arm known as the primary drop arm, not parallel to the first rod (and preferably orthogonal to said rod), said primary drop arm having one end, known as the upstream end, coupled to the downstream end of the first rod by means of a coupling suitable for converting an axial rotation of the first rod into a rotation of the primary drop arm around the axis of the first rod, the opposite end of said primary drop arm being known as the downstream end,
a second rod which extends in a substantially longitudinal direction fixed relative to the chassis, and which has one end, known as the upstream end, articulated on the downstream end of the primary drop arm, and an opposite end known as the downstream end,
a drop arm known as the secondary drop arm, mounted for pivoting, at one end known as the rotation end, around an axis extending in a substantially transverse direction fixed relative to the chassis, said secondary drop arm having an opposite end, known as the control end, on which the downstream end of the second rod is articulated, an arm known as a steering arm, freely articulated, at one end known as the upstream end, on the control end of the secondary drop arm and, at an opposite end known as the downstream end, on the actuation end of the stub pivot arm.

Alternatively, the steering arm is directly articulated on the downstream end of the primary drop arm, and the second rod and the secondary drop arm are eliminated.

In these second and third versions of the invention, the vehicle therefore has no tie bar in the usual sense of the term, which, associated with coupling levers, directly connects the stub pivot arms. On the other hand, the steering bar as claimed in the invention forms a sort of "offset tie bar", which couples indirectly—by means of the two steering gears—the operation of the two stub pivot arms. The fact that the steering bar is "offset" in this way offers great flexibility for adapting the steering system as claimed in the invention to the vehicle geometry: the location of the steering bar and rack housing may be selected as a function of the space available within the vehicle. The steering gear is then specified as a function on the one hand of the distance separating the steering bar from the stub pivot arms, and on the other hand of the obstacles to be circumvented (gearbox, engine etc). The steering gear as claimed in the invention therefore makes it possible, not only to transfer variations in steering length to the stub pivot arms thereby imposing different instantaneous steering angles on the two front guide wheels, but also to accommodate the rack housing and steering bar as claimed in the invention in most known vehicle models.

It should be noted that the prevailing idea in the design of these second and third versions of the invention, and according to which it is possible to offset the rack at a distance from the front wheels, runs totally counter to the prejudices of the man skilled in the art, for whom the rack in a rack steering system is always fitted in proximity to the front axle, on the tie bar.

To advantage and as claimed in the invention, in the second version of the invention, the rack housing and the steering bar are fitted between the dashboard and the engine of the vehicle. This second version is therefore particularly suitable for light modern vehicles, which meet a desire to reduce the dimensions of the front power module (space dedicated to the mechanics, under the front hood) in favor of the passenger compartment, and the engine of which is fitted transversely, for reasons of safety (in the event of an impact, the engine acts as a shield and does not penetrate into the passenger compartment etc) and space requirement. In these vehicles, the only location available to accommodate the steering as claimed in the invention remains the space separating the engine from the dashboard.

It should be noted that the inclination of the steering plane (the angle it forms with a horizontal) is also determined by the space available to accommodate the steering system. The steering plane is for example substantially vertical.

To advantage and as claimed in the invention, in the third version of the invention, the rack housing and the steering bar are fitted in a posterior part of the vehicle (for example in the rear trunk). It should be noted that this third version of the invention is particularly suitable for heavy vehicles with a rigid axle. It can even be fitted onto an existing vehicle, subject to the existing tie bar and stub pivot arms being eliminated, and the actuation levers, steering arms and existing drop arms being retained as stub pivot arms, steering arms and secondary drop arms respectively as claimed by the invention.

It is also possible to accommodate the rack housing and the steering bar in a posterior part of the vehicle in the second version of the invention, and between the dashboard and the engine in the third version of the invention.

The invention, in these three versions, also makes it possible to resolve the problem of buttressing. In the great majority of known steering systems, as in the Jeantaud reduced-scale drawing, each stub pivot arm extends to the rear of the front axle forming an angle with the wheel plane (trapezium geometry), and the rack is formed on a tie bar which, associated with two coupling lever arms, directly connects the stub pivot arms. In these previous versions, the maximum steering angle of each wheel is restricted by the steering geometry itself. Indeed, as the vehicle turning angle increases, the tie bar, the coupling lever arm and the stub pivot arm of the wheel nearside to the turn, (or the wheel offside to the turn, depending on the relative position of the tie bar and the axle) tend toward alignment. An extreme situation may possibly occur wherein these three components are in alignment; the steering system is then locked.

By providing, in the first version, a tie bar (the steering bar) of variable length, the invention makes it possible to abandon the trapezium geometry of previous steering systems and to equip each wheel with a stub pivot arm parallel to the wheel plane, thereby resolving the problem of buttressing. Likewise, by eliminating, in the second and third versions, the tie bar in favor of an offset steering bar and a suitable steering gear, the invention allows the problem of buttressing to be resolved.

To advantage and as claimed in the invention, in the first and second versions, each stub pivot arm extends substantially parallel to the plane of the wheel with which it is associated. In the third version, each stub pivot arm extends preferably orthogonally to the plane of the wheel with which it is associated.

To advantage and as claimed in the invention, the correction plate of the rack housing extends in a plane parallel to the steering plane, and for example merged with the steering plane (this characteristic allows the volume occupied by said plate during movements thereof—when engaged in a turn—to be minimized). Alternatively the correction plate forms an angle with said steering plane.

To advantage and as claimed in the invention, the assembly means include:
- a stirrup formed of two opposite clevises and a core, the stirrup being mounted on the rack housing in such a way that the housing is able to pivot relative to the stirrup around an axis defining the attachment axis of the housing, the clevises of the stirrup extending on either side of said housing; for example, the assembly means comprise a pin passing through the housing on the attachment axis and connecting the two clevises of the stirrup; alternatively, the assembly means comprise two pins on the attachment axis, each pin connecting one of the stirrup clevises and one surface of the rack housing (the housing surface facing said clevis),
- a slide extending in a plane substantially parallel to (and for example merged with) the steering plane, preferably substantially orthogonally to the steering bar when the wheels are straight, said slide having one end fixed to the stirrup, preferably to the core thereof,
- a bearing wherein the slide is able to slide, said bearing being mounted fixed relative to the chassis. For example, the bearing is fixed to the chassis or to the vehicle dashboard.

To advantage and as claimed in the invention, the steering component is a bar forming a slide and the steered component is a slide block slipped onto said slide. Alternatively, one of the components of the steering bar (for example the steered component) is a rod and the other component (for example the steering component) is a tube wherein said rod is able to slide.

To advantage and as claimed in the invention:

the correction plate is formed of at least two stacked panels each having a slot, said slots being stacked so as to form the correction slide rail, said slots being of different widths, the roller is formed of at least two stacked discs, one, the first one, of said discs being fitted in the slot in one, the first one, of the panels, the second disc being fitted in the slot in the second panel, the first disc having a diameter smaller than the width of the slot in the first panel and being fitted so that there is some play provided between said disc and said slot along a longitudinal edge of the correction slide rail, the second disc having a diameter smaller than the width of the slot in the second panel and being fitted so that there is some play provided between said disc and said slot along the other longitudinal edge of the correction slide rail.

This embodiment of the correction plate and roller guarantees that the roller will roll perfectly, in both directions and with no play, in the correction slide rail.

The inventor has established that it might be helpful to be able to deflect both front wheels by one and the same angle of 90°, while the automobile is stationary, with a view to facilitating certain maneuvers such as reversing the automobile into a parking slot. Admittedly, in the case of a vehicle whereof only the front wheels are guide wheels, this wheel steering circumstance does not bear out the conditions for performing a skid-free turn. However, since this type of maneuver is performed at very low speed (the vehicle is initially stationary and is then turned on the spot) and on a one-off basis, this defect is only of slight importance. Alternatively, the vehicle is to advantage fitted with rear guide wheels or simply a device that makes it possible, on a one-off basis, to deflect the rear wheels also by the same 90° angle, thereby allowing the vehicle to move laterally (and without skidding).

To enable both front guide wheels to be deflected simultaneously by 90°:

the correction slide rail is extended at each of its ends by two slots forming slide rails, known as 90° deflection slide rails, the steering system is fitted with means, known as housing displacement means, suitable, when they are activated by the vehicle driver and when the wheels are in the 90° skid-free turn position, for enabling the rack housing to move so as to oblige the roller to move in one or other of the 90° deflection slide rails; these housing displacement means may be mechanical, hydraulic or pneumatic means, including or not including electronic control means, each 90° deflection slide rail follows a curve suitable for enabling, when the housing displacement means are activated, a rotation of the wheel offside to the curve from a steering angle corresponding to a 90° skid-free turn to an angle substantially equal to 90°, without modifying the steering angle of the wheel nearside to the turn.

The inventor has also wanted to allow a conversion of the vehicle, either to produce special effects, or to facilitate some maneuvers particularly when the vehicle is fitted with rear guide wheels or a device that makes it possible, on a one-off basis, to deflect the rear wheels too. To do this, to advantage and as claimed in the invention:

the correction plate comprises a second slot forming a slide rail, known as the special operation slide rail, wherein the roller is able to move, the correction slide rail and the special operation slide rail being merged in an area known as the switchpoint, the steering system comprises switching means, which establish a normal operation mode wherein the roller is guided in the correction slide rail, and a special operation mode wherein the roller is guided in the special operation slide rail, the steering system comprising means for controlling the switching means by the vehicle driver.

The invention also relates to a vehicle characterized by all or some of the characteristics mentioned above and hereinafter.

Other purposes, characteristics and advantages of the invention will emerge from reading the following description, which makes reference to the appended figures that show preferential embodiments of the invention, given solely as non-restrictive examples, and wherein:

FIG. 8 is a front view of another embodiment of a steering system as claimed in the second version of the invention;

FIG. 9 is a cross-section view of the steering system in FIG. 8 along a plane AA substantially orthogonal to the steering bar;

FIG. 10 is a cross-section view of a first portion of the steering system in FIG. 8 along a median longitudinal plane of said steering bar, said portion comprising a longitudinal end of the rack housing, from which the steering component emerges;

FIG. 11 is a cross-section view of the steering system in FIG. 8 along a plane BB substantially orthogonal to said steering bar;

FIG. 12 is a cross-section view of one part of the steering system in FIG. 8 along a plane CC substantially orthogonal to said steering bar;

FIG. 13 is a cross-section view of a second portion of the steering system in FIG. 8 along a median longitudinal plane of the said steering bar, said portion comprising the other longitudinal end of the rack housing, from which the steering component emerges;

FIG. 14 is a cross-section view of the steering system in FIG. 8 along a plane DD substantially orthogonal to the steering bar;

Figure 1:
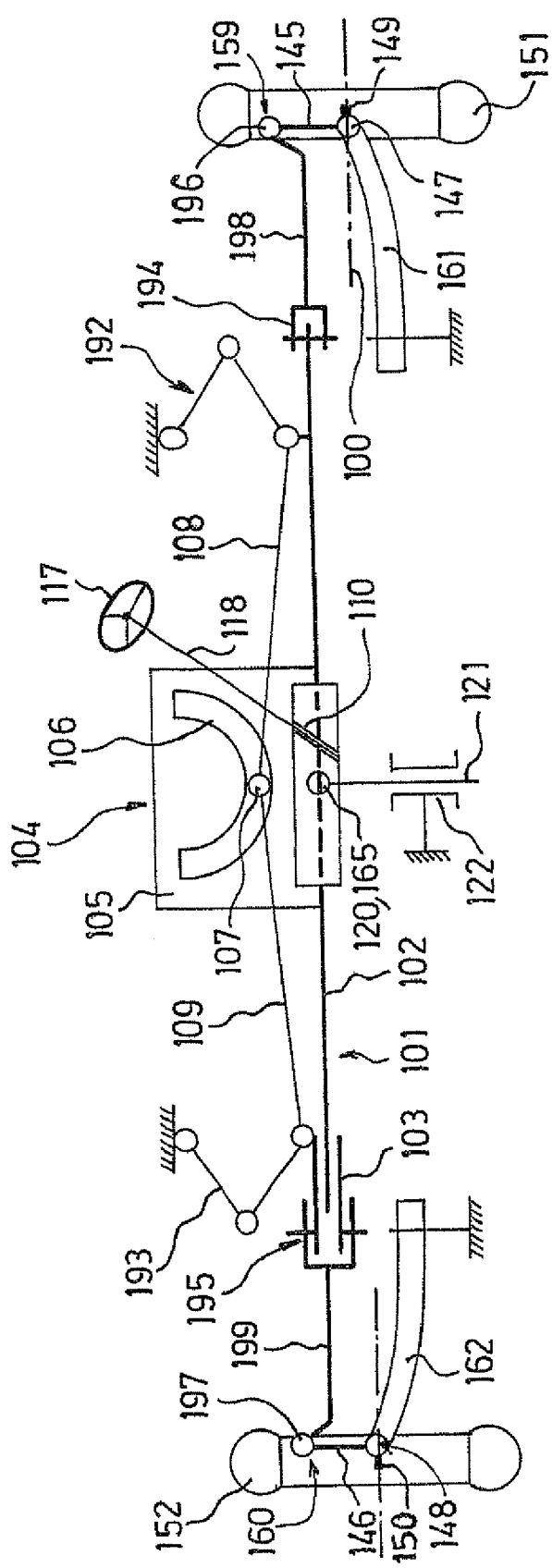
FIGS. 1 to 3 are diagrammatic views from above showing one embodiment of the first version of the invention, illustrating a situation wherein the wheels are straight, turning to the left and turning to the right respectively.
Figure 2:
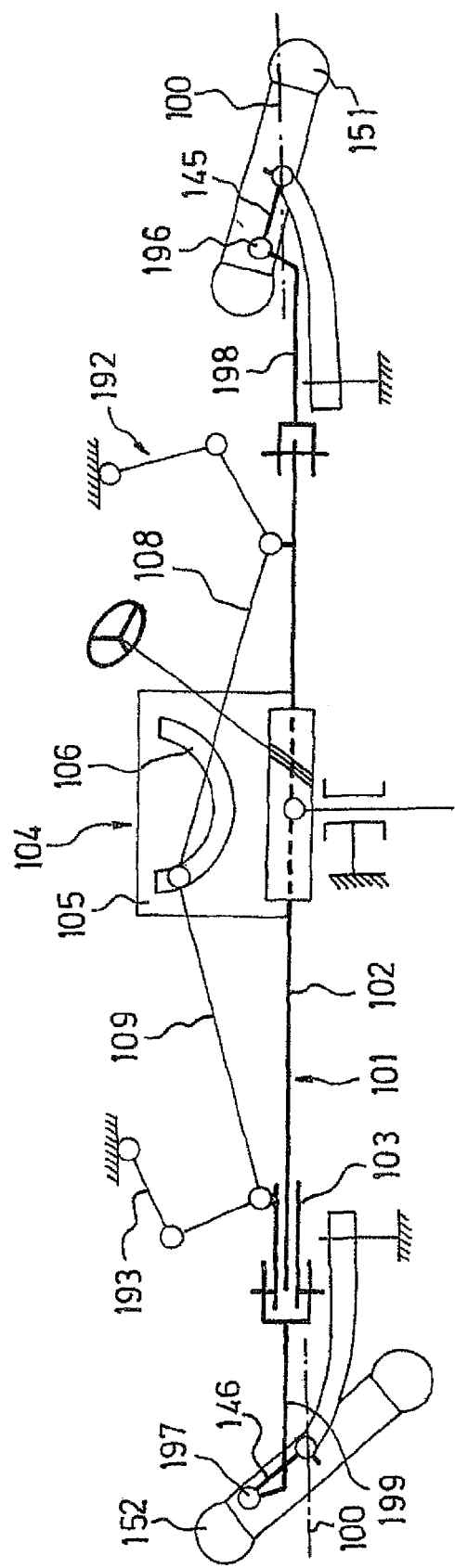
Figure 3:
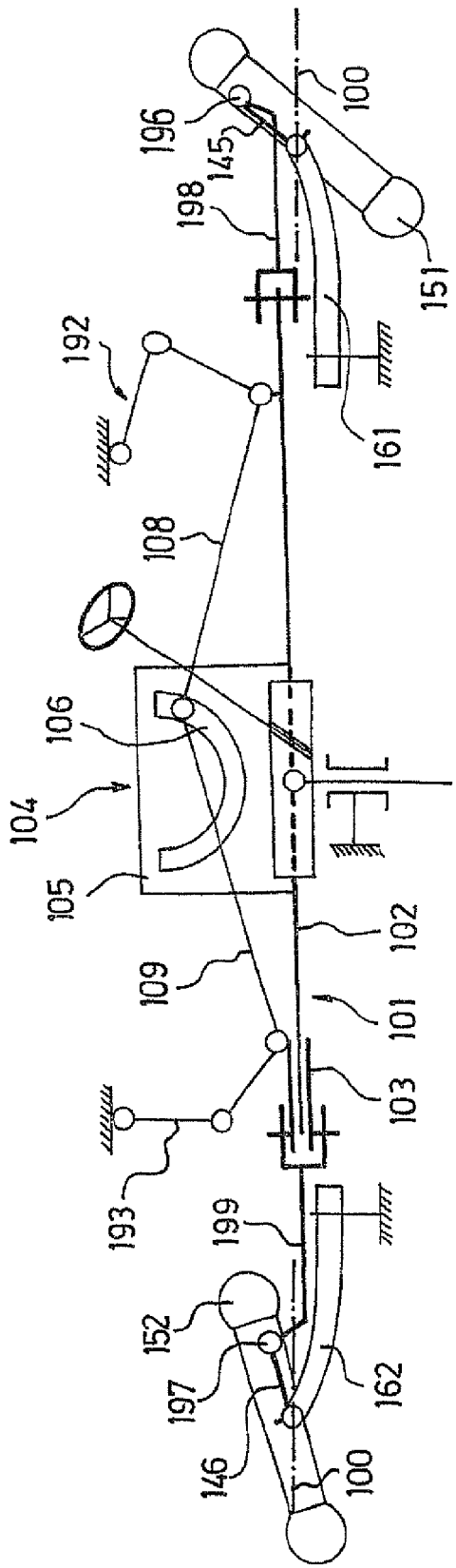
Figure 4:
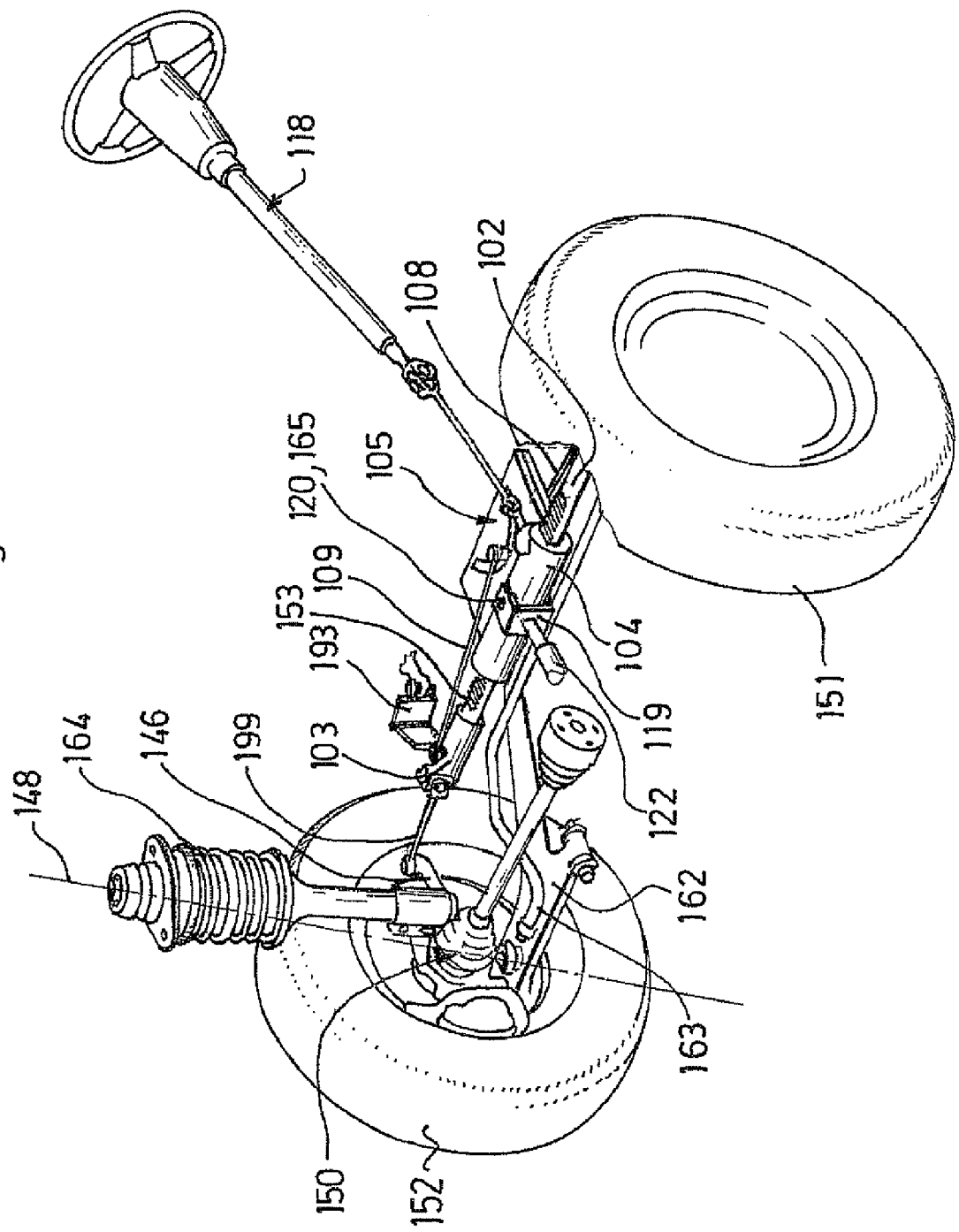
FIG. 4 is a perspective view of one part of a vehicle that includes a steering system like the one shown in FIGS. 1 to 3.

The vehicle as claimed in the invention illustrated in FIGS. 1 to 4 comprises;

two front guide wheels 151, 152. Each wheel is borne by a stub 149, 150 and is associated with a stub pivot arm 145, 146 secured to the stub in rotation around a stub pivot axis 147, 148. Each stub pivot arm has an actuation end 159, 160 for controlling wheel deflection. In the example shown, each stub pivot arm extends substantially parallel to the plane of the wheel with which it is associated, in order to eliminate any risk of buttressing. Furthermore, each stub is suspended from a lower suspension triangle 161, 162 and from an upper suspension spring 164. The two lower suspension triangles are connected, in a known way, by a stabilizer bar 163;

a steering bar 101, comprising a steering component 102 in the form of a rod and a steered component 103 in the form of a tube into which one longitudinal end of the rod 102 is inserted. The steering component 102 bears a rack 153;

a rack housing 104 passed through by the steering component 102, comprising a tubular portion receiving the steering component 102, a correction plate 105 that has a through slot 106 forming a correction slide rail, and a roller 107 suitable for sliding or rolling inside the correction slide rail. The rack 153 is of sufficient length for the rack housing to be passed through by the rack for all wheel steering angles between 0 and 90°. In this example, the rack housing 104 extends substantially in a central part of the steering bar 101 and of the vehicle, when the wheels 151 and 152 are straight (FIG. 1). Alternatively, it is possible to offset the rack housing laterally, subject to the curve followed by the correction slide rail 106 being modified as a consequence;

a pinion 110, which is accommodated in the rack housing 104 and engages with the rack 153;

a steering wheel 117, whereof the rotation is transmitted to the pinion 110 by means of a telescopic steering column 118 formed of two sliding parts;

two correction arms 108, 109, the correction arm 108 being articulated (by pivot connections) on the one hand on the steering component 102 and on the other hand on the roller 107, the correction arm 109 being articulated (by pivot connections) on the one hand on the steered component 103 and on the other hand on the roller 107. In this non-restrictive example, the correction arms are articulated on the steering bar (in other words on the steering component and on the steered component respectively) at points close to the longitudinal ends of said bar. It is possible to equip the steering system with shorter correction arms, articulated on the steering bar at two points further away from its longitudinal ends;

means of assembling the rack housing in the vehicle, comprising a stirrup 119 on which the rack housing is articulated by means of two opposite pins 120 extending along one and the same attachment axis 165. The assembly means also comprise a slide 121 which extends in a longitudinal direction of the chassis, substantially orthogonally to the steering bar when the wheels are straight, said slide being suitable for sliding in a bearing 122 fixed to the chassis. The plane comprising the steering bar 101 and the slide 121 is known as the steering plane. The pins 120 are substantially orthogonal to the steering plane. The rack housing is therefore authorized to move in the steering plane, by pivoting around its attachment axis 165, said attachment axis being able to move in translation in a direction, fixed relative to the chassis, defined by the slide 121. The correction arms 108, 109 are obliged to move in planes parallel to the steering plane. The correction plate 105 extends substantially in the steering plane. In this example, the steering plane and therefore the slide 121 are substantially horizontal;

two coupling lever arms 198, 199. The coupling lever arm 198 is articulated, on the one hand on one end of the steering component 102 (the end of the steering component forming one end of the steering bar) by means of a pivot connection 194, and on the other hand on the actuation end of the stub pivot arm 145 by means of a ball joint connection 196. The coupling lever arm 199 is articulated on the one hand on one end of the steered component 103 (the end of the steered component forming one end of the steering bar) by means of a pivot connection 195, and on the other hand on the actuation end of the stub pivot arm 146 by means of a ball joint connection 197. The coupling lever arm 198 and articulations thereof embody the first steering gear as claimed in the invention; the coupling lever arm 199 and articulations thereof embody the second steering gear as claimed in the invention. It should be noted that the two coupling lever arms are angled in proximity to the stub pivot arms, so as to bring the steering bar 101 closer to the (dummy) axle 100, prevent the corresponding coupling lever arm from touching the wheel nearside to the turn and thereby allow significant steering angles, of up to 90°. It should also be noted that the steering bar 101 and the coupling lever arms 198 and 199 are designed such that the articulation 194 (and 195 respectively) of the coupling lever arm 198 (and 199 respectively) is found in the longitudinal plane containing the pivoting axis of the lower suspension triangle 161 (and 162 respectively) when the wheels are straight (see FIG. 1), for the sake of better compatibility between steering and suspension. In this way, when the vehicle travels in a straight line (zero wheel steering angles), the suspension has no effect on the steering. The suspension only has an effect on the steering when the wheels are significantly deflected (which normally means that the vehicle is moving at low speed; and this effect is negligible;

two level compasses 192, 193 for stabilizing the steering bar. The level compass 192 is articulated on the one hand on the chassis and on the other hand on the steering component 102, preferably in the articulation of the correction arm 108 on said steering component. The level compass 193 is articulated on the one hand on the chassis and on the other hand on the steered component 103, preferably in the articulation of the correction arm 109 on said steered component.

The distance separating the articulation 194, taken as the steering component reference point, and the articulation 195, taken as the steered component reference point, is known as the steering length (in the case in point this length corresponds substantially to the total length of the steering bar). The distance separating the two actuation ends 196 and 197 of the stub pivot arms depends on this steering length, which varies depending on the position of the roller 107 in the correction slide rail 106.

When the steering wheel 117 is turned to the left (FIG. 2), the pinion 110, driven by the steering column, moves the rack 153 and therefore the steering component 102 toward the right of the vehicle (in other words toward the left in FIG. 2) in translation in the axial direction of the steering bar (which is also the axial direction of the steering component 102 and of the steered component 103—it should be noted that this direction is not fixed relative to the chassis—). The translation of the steering component 102 causes, by means of the correction arm 108, a movement of the roller 107 in the correction slide rail, and therefore, by means of the correction arm 109, a translation of the steered component 103 in the axial direction of the steering bar. When the roller moves away from the steering bar 101, the steering length diminishes, so that the steering angle of the left-hand wheel 151 (the wheel nearside to the turn) is larger than the steering angle of the right-hand wheel 152 (the wheel offside to the turn). The curve followed by the correction slide rail has been traced, point by point for each angle of rotation of the pinion, so that these steering angles meet the conditions for a skid-free turn.

Figure 5:
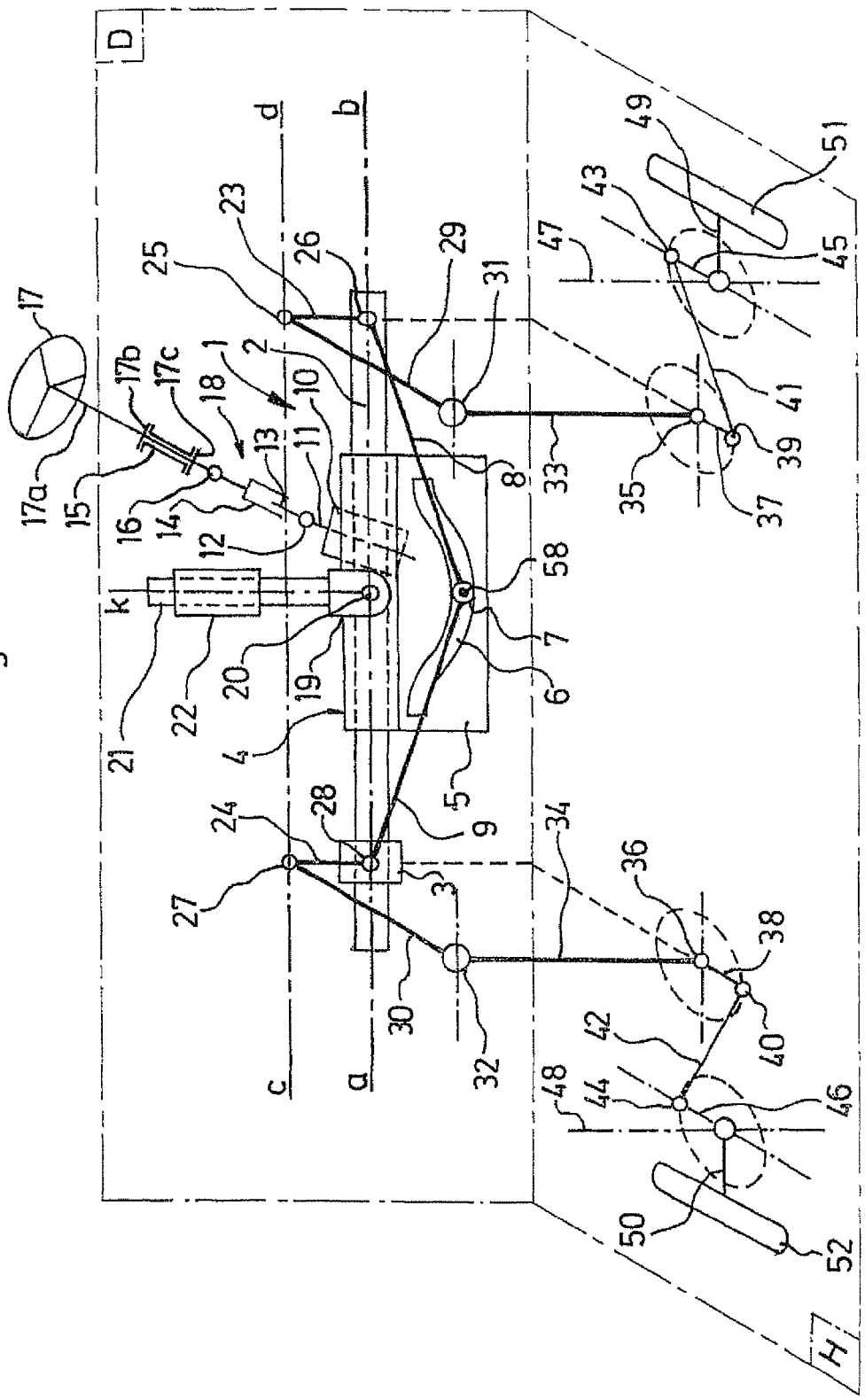
FIGS. 5 and 6 are diagrammatic perspective views of one embodiment of the second version of the invention, illustrating a situation wherein the wheels are straight and turning to the left respectively.
Figure 6:
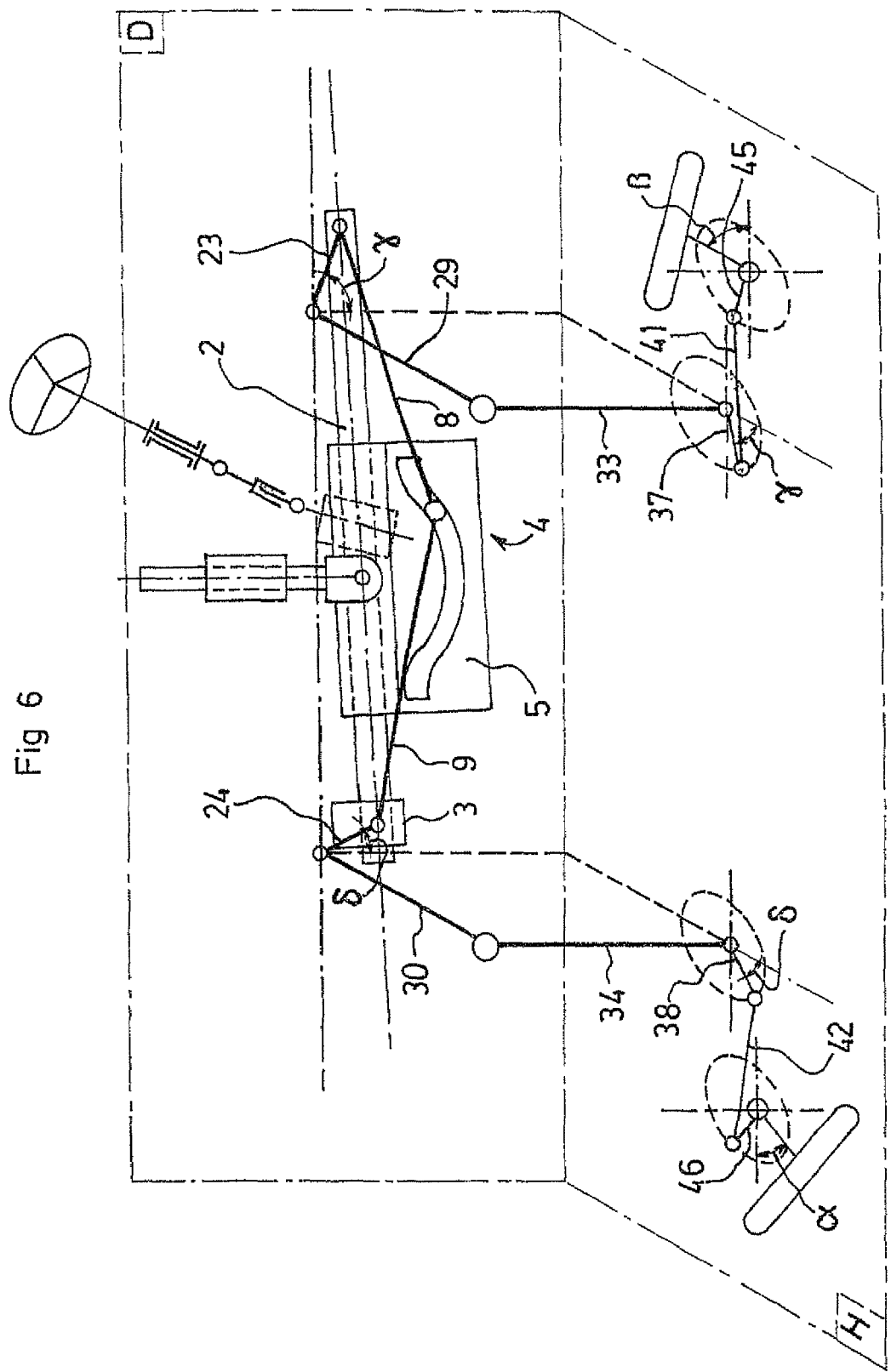

FIGS. 5 and 6 show an embodiment of the second version of the invention. In a similar way to the embodiment previously described, the steering system of the vehicle comprises, in this second version:

a steering bar 1 formed by a steering component 2 in the form of a slide, said steering component bearing a rack, and a steered component 3 in the form of a slide block, these two components being mounted for sliding one relative to the other in the axial direction of the steering bar 1;

a rack housing 4 passed through by the steering component 2, and wherein is accommodated a pinion 10 which engages with the rack; the rack housing additionally comprises a correction plate 5 that has a (through) slot 6 receiving a roller 7;

a steering wheel 17 comprising a steering wheel shaft 17*a*; the steering wheel shaft is mounted for rotating in the chassis by means of a bearing 15 fixed to the dashboard of the vehicle; any translation of said shaft along its axis is furthermore prevented by two stops 17*b* and 17*c* that engage with the bearing 15;

a telescopic steering column 18 comprising two parts secured in axial rotation and mounted for sliding one relative to the other, namely an internally grooved cylinder-shaped barrel 14, coupled to the steering wheel shaft 17*a* by a cardan joint 16, such that a rotation of the steering wheel 17 causes a rotation of the barrel 14, an externally grooved shaft 13, which extends partly inside the barrel 14 and is able to slide axially inside said barrel 14; the combined grooving of the shaft 13 and of the barrel 14 allow a rotation of the barrel 14 to be transmitted to the shaft 13; furthermore, the shaft 13 is coupled to the pinion 10 by a cardan joint 12, such that a rotation of the shaft 13 causes a rotation of the pinion 10;

two correction arms 8 and 9; the correction arm 8 is articulated, on the one hand, on one end of the steering component 2 by means of a pin 26 and, on the other hand, on the roller 7 by means of an axis 58; the correction arm 9 is articulated, on the one hand, on the steered component (slide block) 3 by means of a pin 28 and, on the other hand, on the roller 7 by means of the axis 58; the distance separating the pin 26 (which defines a reference point on the steering component) and the pin 28 (which defines a reference point on the steered component) is known as the steering length; this distance varies depending on the position of the roller 7;

means for assembling the rack housing in the vehicle, which include a slide 21 whereof one end bears a stirrup 19 overlapping the rack housing 4, and a bearing 22 fixed to the dashboard and wherein the slide 21 is able to slide freely; the rack housing 4 is mounted for pivoting relative to the stirrup 19 around an attachment axis 20, by means of two pins fitted on either side of the rack housing. In this example, the steering plane D containing the slide 21 and the steering bar 1 is vertical. Furthermore the correction plate 5 extends in the steering plane. The steering bar and the rack housing are to advantage accommodated between the dashboard and the vehicle engine.

The reference numbers 47 and 48 denote the stub pivot axes of the wheels 51, 52, said wheels being borne by stubs 49, 50. Each stub pivot arm 45, 46 is, in the case in point, parallel to the plane of the wheel 51, 52 with which it is associated.

The first and second versions of the invention differ in the structure of their first and second steering gears. In the embodiment of the second version shown in FIGS. 5 and 6, the first steering gear comprises:

a support link 23 articulated, at one end, on the steering component 2 by means of the pin 26, and mounted for pivoting, at the other end known as the rotation end, relative to the chassis (for example on a component of the dashboard) by means of a pivot connection 25, a driving rod 29 fitted orthogonally to the support link 23, and whereof one upstream end is connected to the rotation end of the support link by a rigid coupling 66, so that a pivoting of the support link according to a given angle is converted into a rotation of the driving rod around its axis according to the same angle; preferably the driving rod 29 is guided in axial rotation by at least one bearing fixed relative to the chassis;

a driven rod 33, whereof one upstream end is connected to the downstream end of the driving rod 29 by means of a pair of bevel pinions 31 (or another constant velocity angle transmission, such as a cardan joint), such that an axial rotation of the driving rod according to a given angle is converted into a rotation of the driven rod around its axis according to the same angle; the driven rod 33 is guided in axial rotation by at least one bearing fixed relative to the chassis, a lever 37, which extends substantially orthogonally to the driven rod and whereof one upstream end is connected to the downstream end of the driven rod 33 by means of a rigid coupling 35, such that an axial rotation of the driven rod according to a given angle is converted into a rotation of the lever around the axis of the driven rod according to the same angle, a connection link 41, whereof one end is freely articulated on the downstream end of the lever 37 by means of a ball joint connection 39 and whereof the other end is freely articulated on the actuation end of the stub pivot arm 45 by means of a ball joint connection 43.

The second steering gear likewise comprises a support link rod 24, articulated on the steered component 3 by means of the pin 28 and mounted for pivoting relative to the chassis by means of a pivot connection 27, a driving rod 30 connected to the support link 24 by a rigid coupling 67, a driven rod 34 connected to the driving rod 30 by a pair of bevel pinions 32 (angle transmission), a lever 38 connected to the driven rod 34 by a rigid coupling 36, a connection link 42 freely articulated on the lever 38 by a ball joint connection 40 and on the actuation end of the stub pivot arm by a ball joint connection 44.

When the steering wheel 17 is turned to the left, the rack is moved toward the left of the vehicle (in other words toward the right in FIG. 6) in translation in the axial direction of the steering bar 1, rotating the support link 23 by an angle γ. The correction arm 8, driven by the steering component 2, moves the roller 7 along the correction slide rail 6, said roller driving the correction arm 9 connected to the steered component 3. The support link 24 therefore pivots by an angle d. The roller 7 extends closer to the steering bar, the steering length has increased, such that the angle d is smaller than the angle γ. The angle γ rotation of the support link 23 is transmitted to the lever 37 by means of the driving and driven rods 29 and 33, said lever pivoting the stub pivot arm 45 and therefore the wheel 51 by a steering angle β by means of the connection link 41. Likewise, the angle d rotation of the support link 24 is transmitted to the lever 38 by means of the driving and driven rods 30 and 34, said lever pivoting the stub pivot arm 46 and therefore the wheel 52 by a steering angle a by means of the connection link 42. It should be noted that the angle β is equal to the angle γ (and the angle α is equal to the angle δ respectively) in the particular case where the support link 23 (and 24 respectively), the lever 37 (and 38 respectively) and the stub pivot arm 45 (and 46 respectively) are all of the same length. Since the steering angles β and a have to bear out the conditions for a skid-free turn, for each pair of angles (a,β) (in other words for each angle β), there is only one possible position for the roller on the correction plate 5. Thus is traced the curve followed by the correction slide rail 6.

Figure 7:
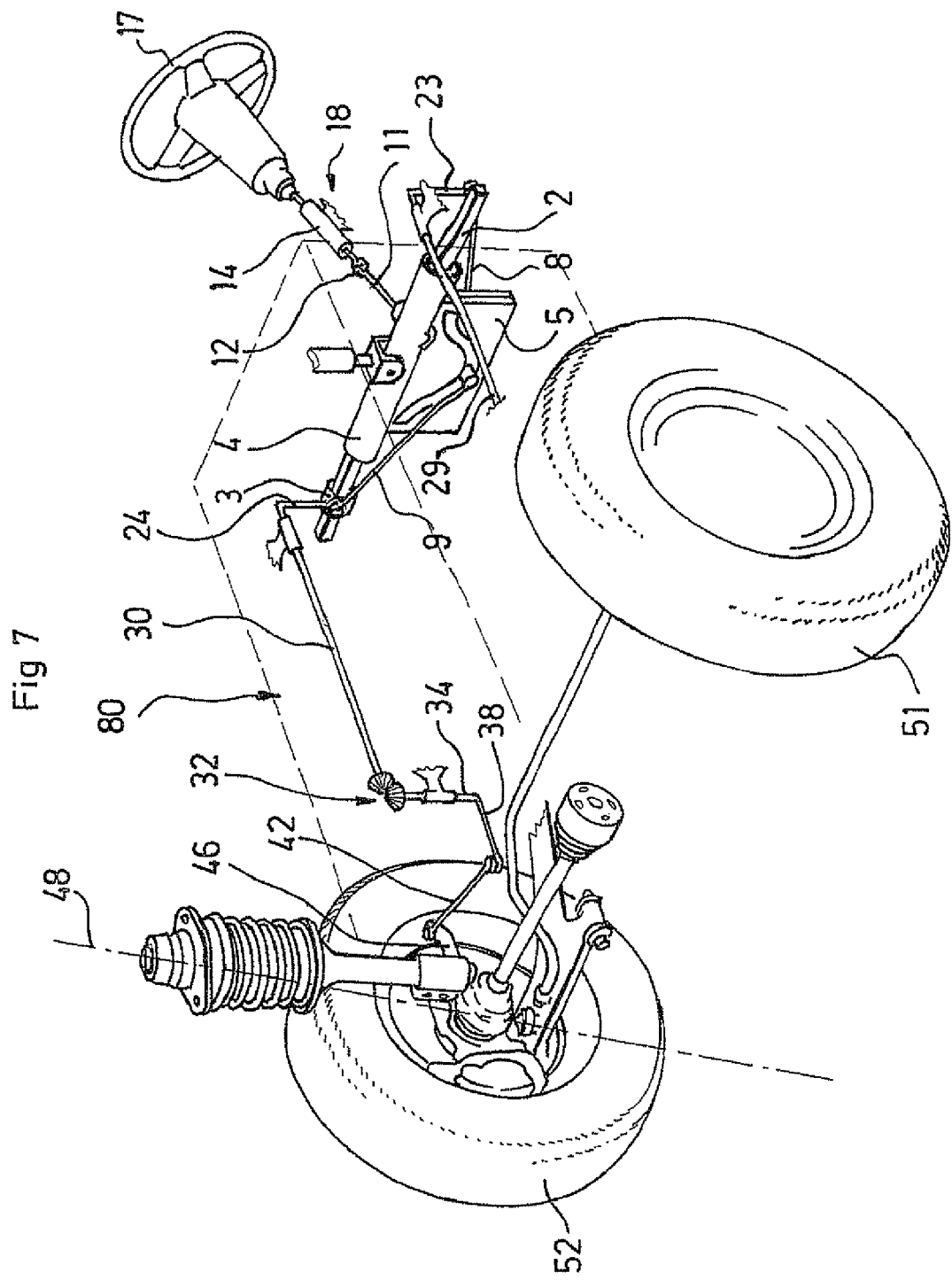
FIG. 7 is a perspective view of one part of a vehicle that includes the steering system illustrated in FIGS. 5 and 6.

These two previous examples are a good illustration of how far the shape of this curve depends on the steering gears selected: in the first embodiment shown in FIGS. 1 to 4, the correction slide rail 106 moves away from the steering bar 101 on either side of a central point corresponding to the position of the roller when the wheels are straight; conversely, in the embodiment shown in FIGS. 5 to 7, the correction slide rail 6 moves closer to the steering bar 1 on either side of a central point corresponding to the position of the roller when the wheels are straight.

In these two embodiments, the curve followed by the correction slide rail 106, 6 is symmetrical relative to a median plane of the correction plate 105, 5 (said plane coinciding with the longitudinal plane of the chassis containing the slide 121, 21 when the wheels are straight—see FIGS. 1 and 5—). This symmetry results from the fact that the correction plate is centered relative to the steering bar and that the correction arms are of identical length. A non-symmetrical curve may be obtained if, for example, the correction plate is offset towards one end of the steering bar.

The shape of the curve followed by the correction slide rail is therefore determined by the choice of steering gear, by the location of the steering gearbox relative to the steering bar, by the layout of the correction arms etc, which are themselves determined by the location and volume available inside the vehicle to accommodate the steering system, given the layout of the other vehicle fittings, symbolized by the block 80 in FIG. 7 (in dotted lines), such as the engine, gearbox etc.

FIGS. 8 to 14 show one part of another embodiment of the second version of the invention, close to the embodiment in FIGS. 5 to 7. In this embodiment, the steering component 202 is formed by a bar whereof one portion at least is hollowed out in order to be able to receive the steered component 203 in the form of a rod of circular cross-section. The steering component 202 has a cross-section which is square overall, whereof one toothed side forms the rack 253 (with which the pinion 210 engages) and whereof the other three sides have longitudinal countersunk grooves 265, each suitable for receiving a block 268 for centering and sliding the steering component 202 in the rack housing 204 (see FIGS. 12 and 13).

The rack housing comprises an overall cylindrical portion of circular cross-section, passed through by the steering component 202, and a correction plate 205, fixed by three screws to a lower extension of the cylindrical portion. The means for assembling the housing in the vehicle (stirrup 219, slide 221 and bearing 222) are identical to those previously described. The rack housing correction plate 205 consists of two stacked panels 254 and 255, of the same dimensions. The panel 254 has a through slot 263; the panel 255 has a through slot 264, smaller in width than the slot 263. The two slots, which extend opposite one another, form the correction slide rail 206. The slot 263 receives a disc 256 with a diameter smaller than the width of said slot, so that some play is left between the disc 256 and the plate 254 along the upper edge of the slot 263 (in other words along one of the longitudinal edges of the correction slide rail). The slot 264 receives a disc 257 with a diameter smaller than the width of said slot, so that some play is left between the disc 257 and the plate 255 along the lower edge of the slot 264 (in other words along the other longitudinal edge of the correction slide rail). The discs 256 and 257 form the roller 207. They are fixed together by means of a screw 258 and a nut 269. Said screw 258 is also used as the articulation for the correction arms 208 and 209 on the roller 207. Skid washers 259 and 260 are interposed between the end of the arm 209 and the head of the screw 258 and the disc 256 respectively, so as to allow the arm 209 to pivot around said screw. Likewise skid washers 261 and 262 are interposed between the end of the arm 208 and the disc 257 and the nut 269 respectively to allow the arm 208 to pivot around the screw 258.

FIG. 9 shows embodiment examples of:
the pivot connection 227 for articulating the support link 224 on the dashboard or chassis,
the pivot connection 228 for articulating both the support link 224 and the correction arm 209 on the steered component 203,
the rigid coupling 266 for fixing in rotation the support link 224 and the driving rod 230 (whereof the upstream end is of square cross-section).
In a similar way, FIG. 14 shows embodiment examples of:
the pivot connection 25 for articulating the support link 223 on the dashboard or chassis,
the pivot connection 226 for articulating both the support link 223 and the correction arm 208 on the steering component 202,
the rigid coupling 267 for fixing in rotation the support link 223 and the driving rod 229 (whereof the upstream end is of square cross-section).

In the embodiment shown in FIGS. 8 and 9, the correction arms 208 and 209 are angled, to prevent them coming in contact with the cylindrical portion of the rack housing when the rack moves, thereby allowing significant steering angles.

Figure 15:
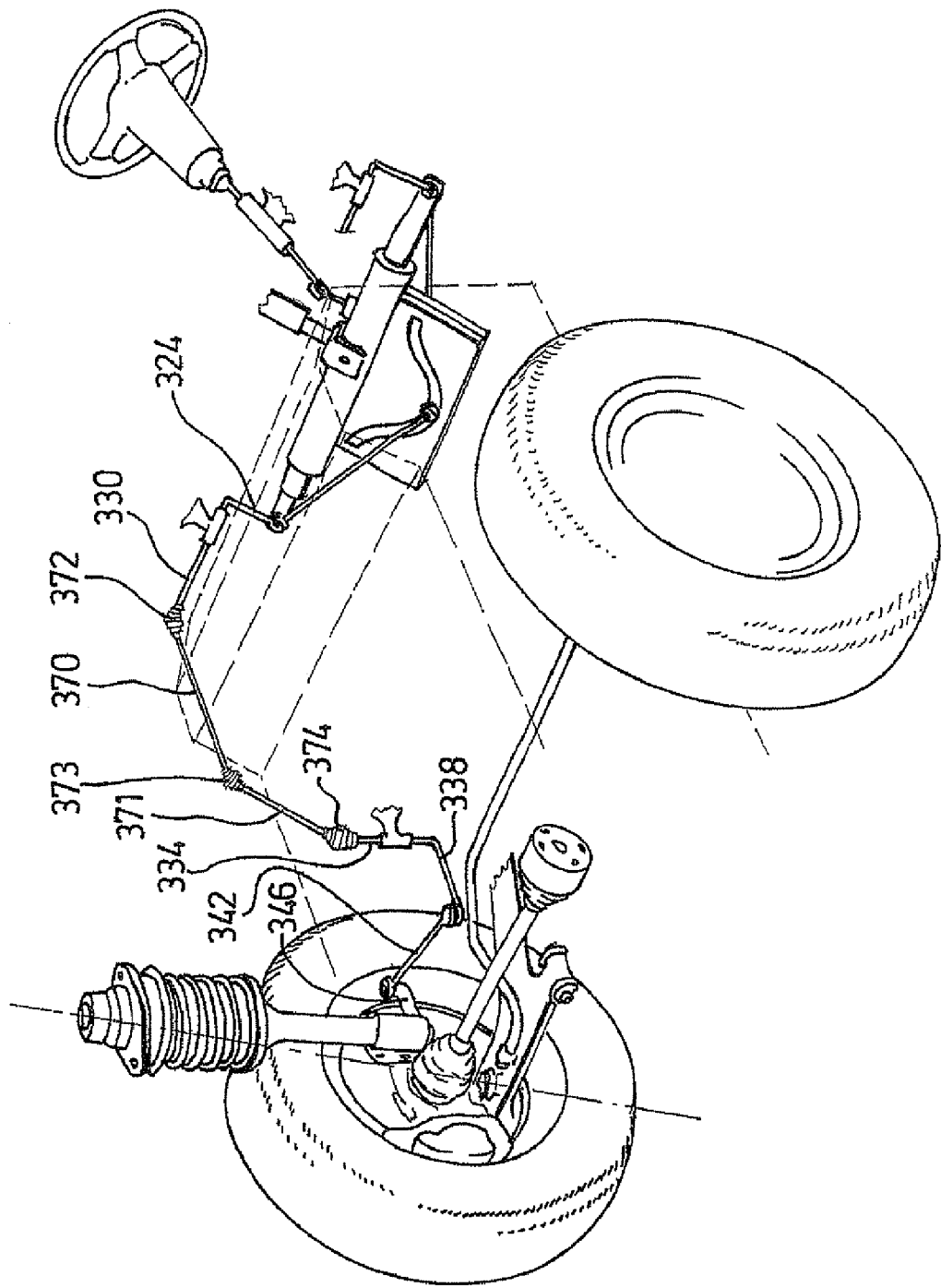
FIG. 15 is a perspective view of one part of a vehicle that includes another embodiment of a steering system as claimed in the second version of the invention.

FIG. 15 illustrates another embodiment of the first and second steering gears as claimed in the second version of the invention. As with the first embodiment shown in FIGS. 5 to 7, the second steering gear comprises a support link 324, a driving rod 330 orthogonal to said support link, a driven rod 334, a lever 338 orthogonal to said driven rod, and a connection link 342. The articulations and couplings associated with these components are the same as those described with reference to FIG. 7. On the other hand, instead and in place of the angle transmission 32 directly coupling the driving rod 30 and the driven rod 34 in the embodiment in FIG. 7, the embodiment in FIG. 15 comprises:
a first intermediate rod 370, whereof the upstream end is coupled to the downstream end of the driving rod 330 by an angle transmission 372,
a second intermediate rod 371, whereof the upstream end is coupled to the downstream end of the first intermediate rod 370 by an angle transmission 373, and whereof the downstream end is coupled to the upstream end of the driven rod 334 by an angle transmission 374.

The first steering gear, connecting the steering component to the other stub pivot arm (not to be seen in the figure) is identical to this second steering gear. The angle transmissions 372, 373 and 374 are preferably of constant velocity, such as cardan joints or bevel gears.

This embodiment makes it possible to understand, on the one hand that the steering plane can be inclined relative to the horizontal, and on the other hand that the steering gears as claimed in the invention can be adapted at will to the vehicle geometry and to the way the other vehicle fittings (particularly the engine) are fitted in the power module. Each steering gear is designed so as to circumvent the fittings interposed between the steering bar component with which it is associated and the corresponding stub pivot arm. The intermediate rod or rods of each steering gear may make it possible to circumvent an obstacle not only in a longitudinal plane of the vehicle (as is illustrated in FIG. 15), but also in a transverse plane of the vehicle: one part of the steering gear is thus offset laterally relative to the end of the tie bar with which the steering gear is associated. And it is not ruled out for provision to be made for first and second steering gears that are different from each other (particularly in the number of intermediate rods).

In all the embodiments shown in FIGS. 1 to 15, the correction arms extend on either side of the correction plate. It is possible, alternatively, for the two correction arms to be fitted on one and the same side of the correction plate. In this alternative, the correction slide rail may be formed of a non through slot, in other words a groove provided on only one side of the correction plate.

Figure 16:
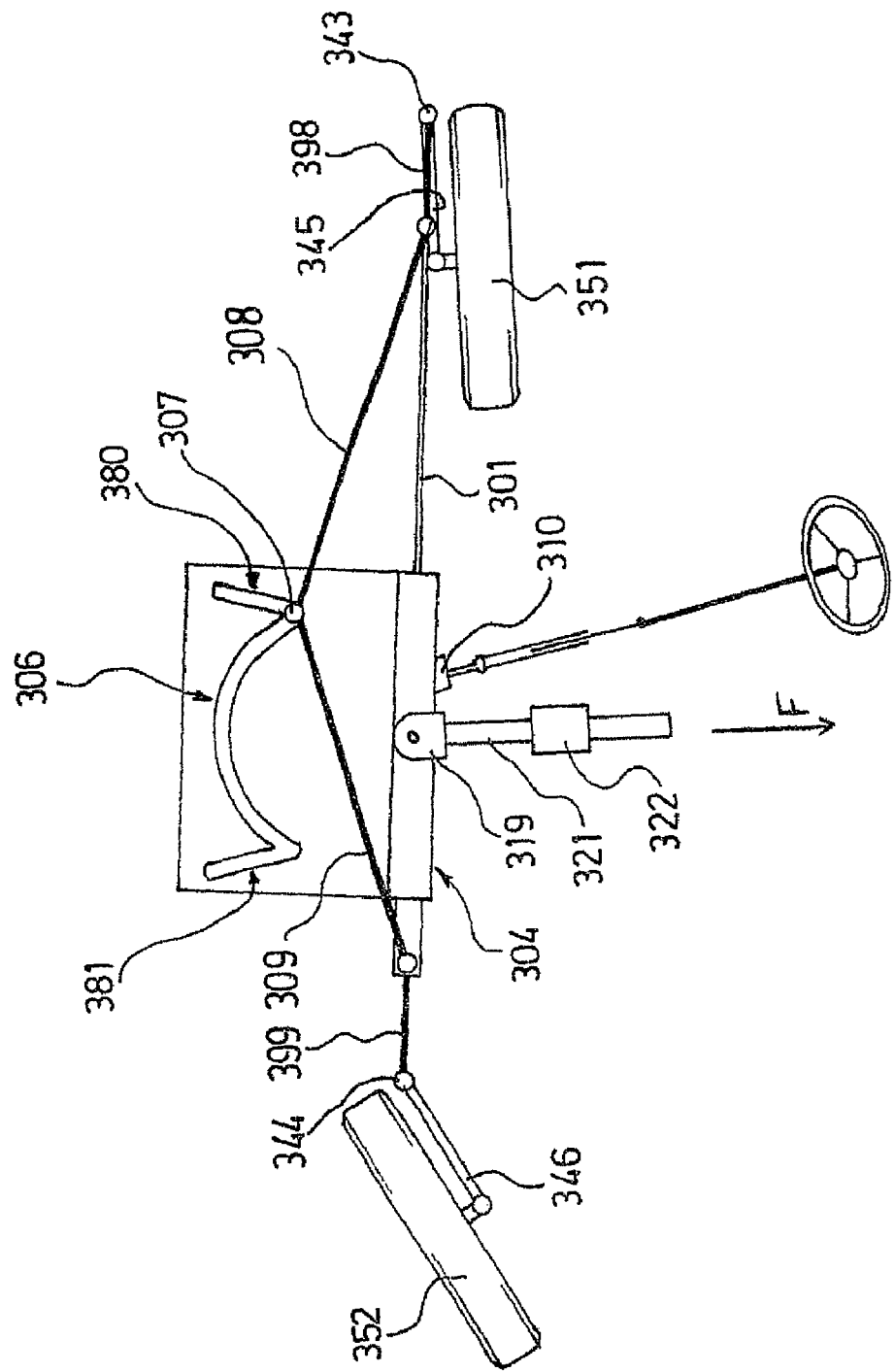
FIGS. 16 and 17 are diagrammatic views from above showing another embodiment of the first version of the invention, illustrating a 90° skid-free turn to the right and a situation wherein the wheels are both deflected 90° to the right respectively.
Figure 17:
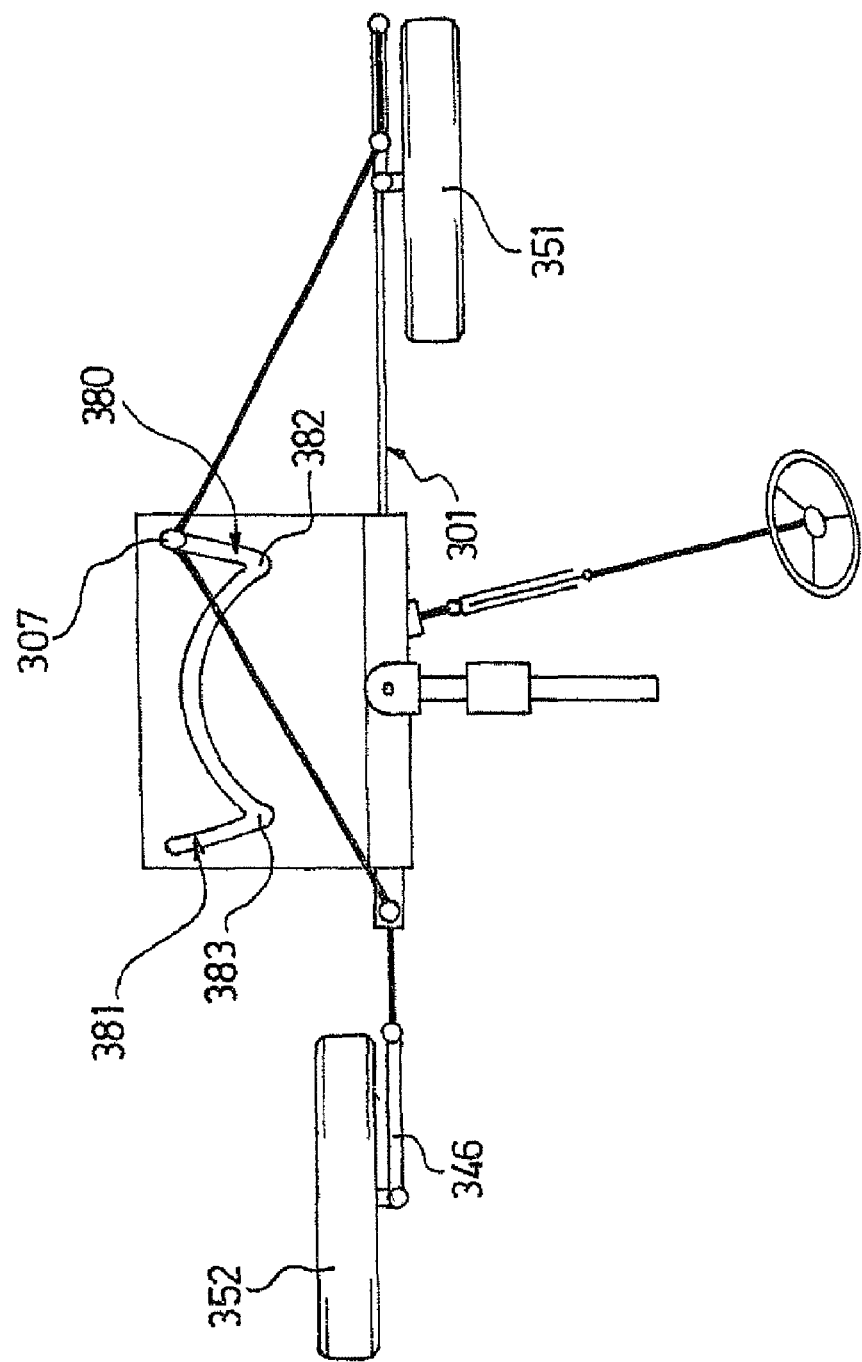

FIGS. 16 and 17 show another embodiment of the first version of the invention. As with the embodiment shown in FIGS. 1 to 4, the steering system comprises a steering bar 301 comprising a steering component and a steered component, two coupling lever arms 398 and 399 connecting the steering component to the stub pivot arm 345 and the steered component to the stub pivot arm 346 respectively, a rack housing 304 fitted with a plate that has a correction slide rail 306, two correction arms 308 and 309 connecting a roller 307 (suitable for moving in the correction slide rail) to the steering component and to the steered component respectively, means 319, 321, 322 for assembling the rack housing in the chassis. It should be noted that, unlike the embodiment shown in FIGS. 1 to 4, the rack housing (and particularly the correction plate thereof) extends forward from the front axle, the pinion 310 extends underneath the rack, and the curve followed by the correction slide rail comes closer to the steering bar on either side of a central point corresponding to the position of the roller 307 when the wheels are straight.

Furthermore, to allow simultaneous 90° deflection of the two front guide wheels, the correction slide rail is extended at each of its ends by two slide rails 380 and 381, known as 90° deflection slide rails. The steering system is fitted with housing displacement means (not shown), which allow the rack housing to move backward, in a substantially longitudinal direction F, when the roller is at the junction between the correction slide rail and one of the 90° deflection slide rails, in other words when the wheels are in the 90° skid-free turn position.

In FIG. 16, the front wheels are in the 90° skid-free right-hand turn position: the right-hand wheel 351 is deflected by 90°, whereas the left-hand wheel 352 is deflected by a smaller angle; the roller 307 is at the right hand end of the correction slide rail 306, at the junction point between this correction slide rail and the 90° deflection slide rail 380. Activating the housing displacement means causes the housing to move toward the front axle (in other words toward the rear of the vehicle), a subsequent movement of the roller 307 in the 90° deflection slide rail 380, and consequently a rotation of the stub pivot arm 346. The 90° deflection slide rail 380 follows a curve which has been traced point by point such that, when the housing moves: the wheel 351 (the wheel nearside to the turn), which is stopped, remains in its initial position, deflected by 90°; the roller 307 describes a circle arc centered around the articulation 343: the wheel 352 (the wheel offside to the turn) pivots around its stub pivot axis between a steering angle corresponding to the 90° skid-free turn (FIG. 16) and an angle substantially equal to 90° (FIG. 17). It should be noted that in so doing, the steering length varies.

Likewise, the skid slide rail 381 follows a curve which has been traced point by point such that, when the wheels are in a 90° skid-free left-hand turn position and the housing displacement means are activated, the right-hand wheel pivots around its stub pivot axis until it forms an angle of 90° with the longitudinal direction of the vehicle, the left-hand wheel remaining motionless, deflected by 90°.

As with the correction slide rail, the curve followed by each 90° deflection slide rail depends on the position of the rack housing in the vehicle, on the steering gears etc., selected, and on the direction of displacement of the housing (in other words the housing displacement means selected).

It should be noted that there is an area in which the roller 307 is not guided at each of the two junctions between the correction slide rail 306 and the 90° deflection slide rails 380, 381. To limit the impact thereof, it is particularly advantageous to use a correction plate that comprises two stacked panels pierced through with slots of different widths, and a roller comprising two discs of different diameters, borne by one and the same axis, like the correction plate and roller described in reference to FIG. 11. Indeed, in this case, the unguided area of the roller corresponds in the end to the restricted unguided area of the smallest diameter disc.

Figure 18:
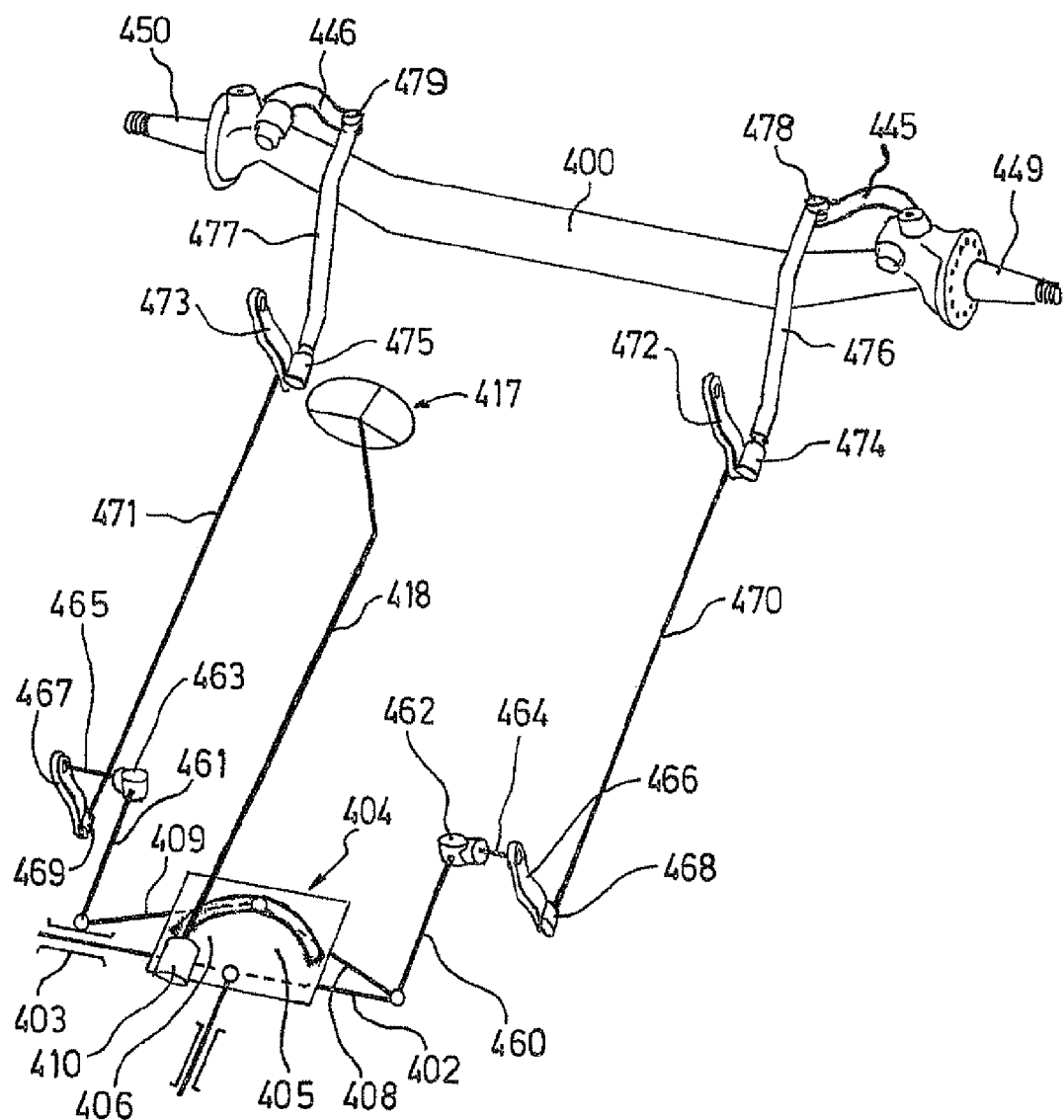
FIG. 18 is a diagrammatic perspective view of one embodiment of the third version of the invention.

FIG. 18 shows a third version of the invention, particularly suitable for heavy vehicles with a rigid axle. The corresponding steering system can be assembled in an existing vehicle simply by making small adjustments to the vehicle. A heavy vehicle usually comprises a steering wheel 417, a rigid axle 400 connecting the stubs 449 and 450 of the front guide wheels, and two actuation levers 445 and 446, whereof at least one is associated with a steering rod 477 and a drop arm 473. These components are retained in the steering system as claimed in the invention, the control levers 445 and 446 acting as stub pivot arms as claimed in the invention. On the other hand, the tie bar, the initial stub pivot arms and the screwed steering gearbox of the existing vehicle are eliminated.

The drop arms 473 and 472 are mounted for pivoting around one and the same transverse axis fixed relative to the chassis, by their upper end known as the rotation end. The drop arm 472 (and 473 respectively) has one end, known as the control end, opposite its rotation end and freely articulated by a ball joint connection 474 (and 475 respectively) on an upstream end of the steering arm 476 (and 477 respectively). The opposite end of the steering arm 476 (and 477 respectively) is freely articulated on the actuation end of the stub pivot arm 445 (and 446 respectively) by a ball joint connection 478 (and 479 respectively). The steering arms 476 and 477 extend in substantially longitudinal directions when the wheels are straight. It should be noted that the stub pivot arms 445 and 446 extend overall substantially orthogonally to the wheels, unlike with the embodiments previously described.

The steering system as claimed in the invention further comprises a telescopic steering column 418, an offset steering bar comprising a rack steering component 402 and a steered component 403, a rack housing 404 fitted with a correction plate that has a correction slide rail 406, a pinion 410 driven in rotation by the steering column and which engages with the rack, correction arms 408 and 409, and means for assembling the rack housing in the chassis like those previously described, defining in the case in point a horizontal steering plane. The steering bar and the rack housing are accommodated in a posterior part of the vehicle, and particularly to the rear of the steering wheel 417 (unlike in the embodiments previously described). This example is a good illustration of the flexibility offered by the invention in choosing the location for the steering system: it is in fact possible to accommodate the steering bar and the rack housing outside the front power module of the vehicle, and to do so whatever type of vehicle is involved (and therefore, in the case of a light vehicle, the steering system can be accommodated in a lower portion of the vehicle trunk at the rear), subject to the steering gear and the steering column being adapted.

The steering system further comprises a first (and a second respectively) steering gear comprising:
- a support link 460 (461), which extends in a horizontal plane (steering plane), and which has one end articulated on the steering component 402 (on the steered component 403) by a pivot connection and an opposite end, known as the rotation end, articulated on the chassis by a pivot connection,
- a first rod 464 (465) extending substantially in a transverse direction fixed relative to the chassis, and whereof an upstream end is coupled to the rotation end of the support link 460 (461) by means of a coupling 462 (463) (for example a pair of bevel pinions) suitable for converting a pivoting of the support link into an axial rotation of the first rod, said first rod being guided in axial rotation by means of a bearing fixed relative to the chassis,
- a primary drop arm 466 (467), which extends substantially in a longitudinal vertical plane of the chassis, and whereof an upstream end is coupled to the downstream end of the first rod 464 (465) by means of a rigid coupling,
- a second rod 470 (471), which extends substantially horizontally in a longitudinal vertical plane of the chassis, and whereof an upstream end is articulated on the downstream end of the primary drop arm 466 (467) by means of a pivot or ball joint connection 468 (469), and whereof the downstream end is articulated on the control end of the drop arm 472 (473) known as the secondary drop arm, by means of a pivot or ball joint connection,
- said secondary drop arm 472 (473), the steering arm 476 (477) and the associated articulations.

It should be noted that the relative position of the rack and pinion (rack formed on a lower surface of the steering component and pinion fitted underneath the rack, or rack formed on an upper surface of the steering component and pinion fitted above the rack) determines the direction of movement of the rack, and therefore the direction of rotation of the wheels, for a given direction of rotation of the pinion. It may be advantageous to choose (for example for reasons of space and available location) the relative position of the rack and pinion. Once this choice has been made, if the direction of rotation of the wheels does not correspond to the direction of rotation of the steering wheel, a pair of pinions has only to be inserted between two components of the steering column or between the steering column and the steering wheel shaft or the pinion, in order to re-establish consistency between the direction of rotation of the steering wheel and the direction of rotation of the wheels.

Figure 19:
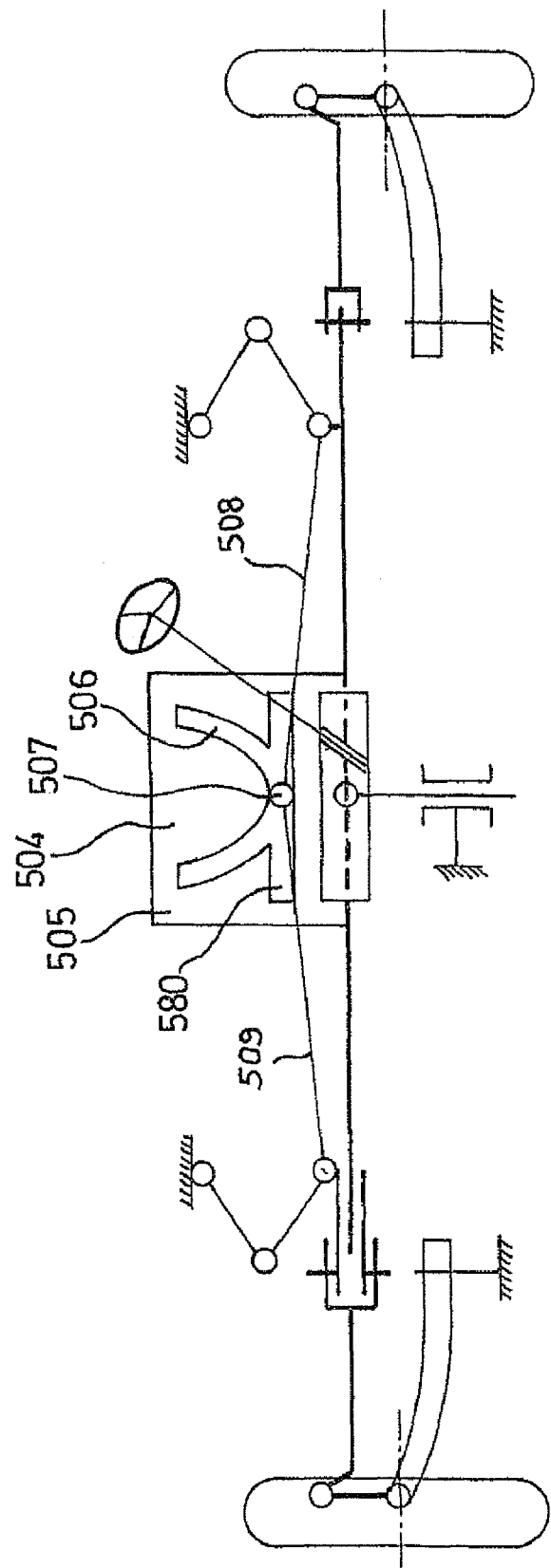
FIG. 19 is a diagrammatic view from above of another embodiment of the first version of the invention.

FIG. 19 shows an improvement to the embodiment shown in FIGS. 1 to 4, wherein the rack housing 504 comprises a correction plate 505 which has, apart from a correction slide rail 506 receiving a roller 507, a second slide rail 580 known as a special operation slide rail, wherein the roller 507 is able to move. This special operation slide rail 580 extends substantially parallel to the steering bar, so that the triangle formed by the steering bar 501 and the correction arms 508 and 509 is not distorted when the roller moves in the slide rail 580. The steering length is therefore constant when the roller moves in the slide rail 580; the difference between the steering angles of the two wheels therefore stays the same when the roller moves in this slide rail 580. In the case in point, the slide rail is formed in such a way that this difference is nil and the wheels are therefore constantly parallel. The result is that the correction slide rail 506 and the special operation slide rail 580 come together and merge at a switch point corresponding to a position of the roller wherein the wheels are straight. The two slide rails move away from each other on either side of this switch point. The steering system further comprises switching means (not shown) making it possible to select the slide rail (506 or 580) which the roller 507 is to follow, and means for controlling the switching means, which can be activated by the vehicle driver.

These switching means therefore specify two operating modes of the vehicle: a normal operation mode wherein the roller moves in the correction slide rail 506 and the vehicle turns without the wheels skidding, and a special operation mode wherein the roller moves in the special operation slide rail 580 and the wheels of the vehicle are constantly parallel. This special operation mode can be used to facilitate certain very low speed vehicle maneuvers, particularly if the vehicle is fitted with rear guide wheels; it is then possible to park the vehicle in the tiniest spaces. Such a vehicle will achieve its maximum potential in terms of use in certain professions; the fire service, police, deliveries, civil engineering projects, equipment fitting etc. The special operation mode can also be used to increase the skidding of the vehicle wheels when taking a curve at higher speed, thereby producing a spectacular effect. Such use is intended for the cinema industry.

It goes without saying that the invention can be subject to many alternatives relative to the embodiments described and illustrated.

In particular, whatever the version of the invention, the correction plate may comprise 90° deflection slide rails and/or a special operation slide rail.

The invention claimed is:

1. Motor vehicle comprising:
   a chassis,
   wheels including at least two guide wheels at a front of the vehicle, each guide wheel being borne by a stub to which an arm known as a stub pivot arm is rigidly secured, said stub and said stub pivot arm being mounted for rotating around an axis known as the stub pivot axis, the stub pivot arm having one end secured to the stub and an opposite end known as the actuation end,
   a steering system comprising:
      a steering column controlled, in axial rotation, by a steering wheel able to be activated by a vehicle driver,
      a pinion driven in rotation by the steering column,
      a rack with which the pinion engages,
      a rack housing receiving said pinion and said rack,
   wherein:
   the steering system comprises a unit forming a bar, known as the steering bar, said steering bar comprising at least two coaxial components mounted for sliding one relative to the other in an axial direction of said steering bar, one of the components being known as the steering component, the other component being known as the steered component;

the steering component passes through the rack housing and bears the rack, such that rotating the pinion causes a translation of the steering component in the axial direction of the steering bar, the rack housing comprises a plate, known as a correction plate, comprising a slot forming a slide rail, known as a correction slide rail, receiving a roller suitable for moving along said correction slide rail, the steering system comprises two arms, known as correction arms, one of said correction arms being mounted articulated, at one end, on the roller and, at the other end, on the steering component, the other correction arm being mounted articulated, at one end, on the roller, and, at the other end, on the steered component, such that the steering bar and the two correction arms form a triangle that is deformable according to the position of the roller in the correction slide rail, the steering system comprises means for assembling the rack housing in the vehicle, suitable for allowing the rack housing to pivot in a plane (D) known as the steering plane, around an axis of said housing known as the attachment axis, the assembling means being moreover suitable for preventing any movement of the attachment axis in a transverse direction of the chassis and for allowing said attachment axis to move in a direction contained in the steering plane and in a longitudinal plane of the chassis, the steering column is suitable for absorbing any movement of the rack housing, the steering system comprises a first steering gear connecting the steering component to the actuation end of one, the first one, of the stub pivot arms, and a second steering gear connecting the steered component to the actuation end of the second stub pivot arm, the correction slide rail follows a suitable curve, according to the first and second steering gears, such that the vehicle wheel stubs extend in directions which intersect, at each time, at one and the same point.

2. Vehicle as claimed in claim 1, wherein the steering column comprises at least two coaxial parts mounted for sliding one relative to the other in an axial direction of the steering column, including one part coupled to the steering wheel axis and one part coupled to the pinion.

3. Vehicle as claimed in claim 1, wherein:

the steering bar extends in proximity to a front axle the first steering gear comprises a first coupling lever arm, articulated on one end of the steering component and on the actuation end of the first stub pivot arm respectively, the second steering gear comprises a second coupling lever arm, articulated on one end of the steered component and on the actuation end of the second stub pivot arm respectively.

4. Vehicle as claimed in claim 3, wherein the steering system comprises at least one level compass connecting one of the components of the steering bar to the chassis.

5. Vehicle as claimed in claim 1, wherein:

the vehicle has no tie bar, the first steering gear comprises a link, known as a support link, which extends in a plane substantially parallel to the steering plane and which carries the steering component, said support link being mounted for pivoting, at one end known as a rotation end, around an axis fixed relative to the chassis and being articulated, at the other end, on the steering component;

the second steering gear comprises a link, known as a support link, which extends in a plane substantially parallel to the steering plane and which carries the steered component, said support link being mounted for pivoting, at one end known as a rotation end, around an axis fixed relative to the chassis and being articulated, at the other end, on the steered component, the first and second steering gears each comprise at least a rod, known as a driving rod, which extends orthogonally to the support link, said rod having an end, known as an upstream end, coupled to the rotation end of the support link by means of a coupling suitable for converting a pivoting of the support link into an axial rotation of the driving rod, the opposite end of the driving rod being known as a downstream end, a rod, known as a driven rod, which has an end, known as an upstream end, connected to the driving rod by means of fittings, known as intermediate fittings, suitable for converting an axial rotation of the driving rod into an axial rotation of the driven rod, said driven rod having an opposite end known as a downstream end, a lever not parallel to the driven rod, said lever having an end, known as an upstream end of the lever, coupled to the downstream end of the driven rod by means of a coupling suitable for converting an axial rotation of the driven rod into a rotation of the lever around the axis of said driven rod, the opposite end of the lever being known as a downstream end of the lever, a link known as a connection link, freely articulated, at one end, on the downstream end of the lever and, at the other end, on the actuation end of the stub pivot arm.

6. Vehicle as claimed in claim 5, wherein said intermediate fittings comprise an angle transmission directly coupling the downstream end of the driving rod and the upstream end of the driven rod.

7. Vehicle as claimed in claim 6, wherein the angle transmissions are constant velocity angle transmissions.

8. Vehicle as claimed in claim 5, wherein said intermediate fittings comprise a rod, known as an intermediate rod, not parallel to the driving and driven rods, said intermediate rod being coupled, at one end, to the downstream end of the driving rod by means of an angle transmission suitable for converting an axial rotation of the driving rod into an axial rotation of the intermediate rod, said intermediate rod being coupled, at the other end, to the upstream end of the driven rod by means of an angle transmission suitable for converting an axial rotation of the intermediate rod into an axial rotation of the driven rod.

9. Vehicle as claimed in claim 5, wherein said intermediate fittings comprise a succession of several intermediate rods connected to each other and to the driving and driven rods by angle transmissions.

10. Vehicle as claimed in claim 5, wherein the rack housing and the steering bar are fitted between a dashboard and a vehicle engine.

11. Vehicle as claimed in claim 5, wherein the rack housing and the steering bar are fitted at a rear of the vehicle.

12. Vehicle as claimed in claim 1, wherein each stub pivot arm extends substantially parallel to the plane of the wheel with which it is associated.

13. Vehicle as claimed in claim 1, wherein:

the vehicle has no tie bar, the first steering gear comprises a link, known as a support link, which extends in a plane substantially parallel to the steering plane and which carries the steering component, said support link being mounted for pivoting, at one end known as a rotation end, around an axis fixed relative to the chassis and being articulated, at the other end, on the steering component;

the second steering gear comprises a link, known as a support link, which extends in a plane substantially parallel to the steering plane and which carries the steered component of the steering bar, said support link being mounted for pivoting, at one end known as a rotation end, around an axis fixed relative to the chassis and being articulated, at the other end, on the steered component, the first and second steering gears each comprise also at least:

a first rod which extends in a substantially transverse direction fixed relative to the chassis, and which has one end, known as an upstream end, coupled to the rotation end of the support link by means of a coupling suitable for converting a pivoting of the support link into an axial rotation of the first rod, said first rod being guided in axial rotation in the vehicle by means of at least one bearing fixed relative to the chassis, the opposite end of the first rod being known as a downstream end, a drop arm known as a primary drop arm, not parallel to the first rod, said primary drop arm having one end, known as an upstream end, coupled to the downstream end of the first rod by means of a coupling suitable for converting an axial rotation of the first rod into a rotation of the primary drop arm around the axis of the first rod, the opposite end of said primary drop arm being known as a downstream end, a second rod which extends in a substantially longitudinal direction fixed relative to the chassis, and which has one end, known as an upstream end, articulated on the downstream end of the primary drop arm, and an opposite end known as a downstream end, a drop arm known as a secondary drop arm, mounted for pivoting, at one end known as a rotation end, around an axis extending in a substantially transverse direction fixed relative to the chassis, said secondary drop arm having an opposite end, known as a control end, on which the downstream end of the second rod is articulated, an arm known as steering arm, freely articulated, at one end known as an upstream end, on the control end of the secondary drop arm and, at an opposite end known as a downstream end, on the actuation end of the stub pivot arm.

14. Vehicle as claimed in claim 1, wherein the correction plate extends in a plane parallel to the steering plane (D).

15. Vehicle as claimed in claim 1, wherein the assembling means comprise:

a stirrup formed of two opposite clevises and a core, the stirrup being mounted on the rack housing in such a way that the housing is able to pivot relative to the stirrup around an axis defining the attachment axis of the housing, the stirrup clevises extending on either side of said housing, a slide extending in a plane substantially parallel to the steering plane, substantially orthogonally to the steering bar when the wheels are straight, said slide having one end fixed to the stirrup, a bearing wherein the slide is able to slide, said bearing being mounted fixed relative to the chassis.

16. Vehicle as claimed in claim 1, wherein the steering component is a bar forming a slide and the steered component is a slide block slipped onto said slide.

17. Vehicle as claimed in claim 1, wherein one of the components of the steering bar is a rod and the other component is a tube wherein the rod is able to slide.

18. Vehicle as claimed in claim 1, wherein:

the correction plate is formed of at least two stacked panels each having a slot, said slots being stacked so as to form the correction slide rail, said slots being of different widths, the roller is formed of at least two stacked discs, one, the first one, of said discs being fitted in the slot in one, the first one, of the panels, the second disc being fitted in the slot in the second panel, the first disc having a diameter smaller than the width of the slot in the first panel and being fitted so that there is some play provided between said first disc and said slot along a longitudinal edge of the correction slide rail, the second disc having a diameter smaller than the width of the slot in the second panel and being fitted so that there is some play provided between said second disc and said slot along the other longitudinal edge of the correction slide rail.

19. Vehicle as claimed in claim 1, wherein:

the correction slide rail is extended at each of its ends by two slots forming slide rails, known as 90° deflection slide rails, the steering system is fitted with means, known as housing displacement means, suitable, when they are activated by the vehicle driver and when the wheels are in a 90° skid-free turn position, for enabling the rack housing to move so as to oblige the roller to move in one or other of the 90° deflection slide rails, each 90° deflection slide rail follows a curve suitable for enabling, when the housing displacement means are activated, a rotation of the wheel offside to the turn from a steering angle corresponding to a 90° skid-free turn to an angle substantially equal to 90°, without modifying the steering angle of the wheel nearside to the turn.

20. Vehicle as claimed in claim 1, wherein:

the correction plate comprises a second slot forming a slide rail, known as the special operation slide rail, wherein the roller is able to move, the correction slide rail and the special operation slide rail being merged in an area known as a switch point, the steering system comprises switching means, which establish a normal operation mode wherein the roller is guided in the correction slide rail and a special operation mode wherein the roller is guided in the special operation slide rail, the steering system comprising means for controlling the switching means by the vehicle driver.

* * * * *